(12) United States Patent
Bebawy et al.

(10) Patent No.: US 11,295,337 B1
(45) Date of Patent: Apr. 5, 2022

(54) TRANSACTION-BASED PROMOTION CAMPAIGN

(71) Applicant: Square, Inc., San Francisco, CA (US)

(72) Inventors: Ramy Bebawy, San Francisco, CA (US); Philip Zigoris, San Francisco, CA (US); Lily Chiang, San Francisco, CA (US); James Hart, Livermore, CA (US); Rujia Zha, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 187 days.

(21) Appl. No.: 15/610,213

(22) Filed: May 31, 2017

(51) Int. Cl.
*G06Q 30/02* (2012.01)

(52) U.S. Cl.
CPC ..... *G06Q 30/0244* (2013.01); *G06Q 30/0224* (2013.01); *G06Q 30/0235* (2013.01); *G06Q 30/0255* (2013.01); *G06Q 30/0264* (2013.01); *G06Q 30/0207* (2013.01)

(58) Field of Classification Search
CPC .......... G06Q 30/0244; G06Q 30/0255; G06Q 30/0264; G06Q 30/0207; G06Q 30/0224; G06Q 30/0235
See application file for complete search history.

(56) References Cited

U.S. PATENT DOCUMENTS

| | | | |
|---|---|---|---|
| 5,353,218 A * | 10/1994 | De Lapa | G06Q 20/20 705/14.25 |
| 6,505,168 B1 | 1/2003 | Rothman et al. | |
| 6,694,300 B1 | 2/2004 | Walker et al. | |
| 7,379,916 B1 | 5/2008 | Mizrah | |
| 8,868,522 B1 | 10/2014 | Zennaro et al. | |
| 9,015,277 B1 | 4/2015 | Slavin et al. | |
| 9,286,608 B1 | 3/2016 | Patel et al. | |
| 9,990,621 B1 * | 6/2018 | Ng | G06Q 20/202 |

(Continued)

OTHER PUBLICATIONS

"Know What Your Customers Want Before They Do" (Davenport et al., published in Dec. 2011 in Harvard Business Review magazine); (Year: 2011).*

(Continued)

*Primary Examiner* — James M Detweiler
(74) *Attorney, Agent, or Firm* — Lee & Hayes, P.C.

(57) ABSTRACT

Techniques and arrangements for generating, distributing and managing promotion campaigns are described. A promotion server may generate the promotion campaigns based on input from a merchant. The input may include a request to generate the promotion campaign, a merchant preference, or other information shared between the merchant and the promotion server. The promotion campaign may include promotions, such as coupons, discounts, or the like, to encourage transactions with a merchant. The promotions may be generated based on merchant specified criteria, a merchant transaction history, customer preferences, a customer transaction history, and/or other information processed by the promotion server. The promotions of the promotion campaign may be distributed via one or more channels, such as electronic mail, web site publication, receipts, etc. Each promotion of the promotion campaign may be linked to a particular customer, thereby limiting the number of times a particular customer can take advantage of the promotion campaign.

20 Claims, 8 Drawing Sheets

(56) References Cited

U.S. PATENT DOCUMENTS

| | | | |
|---|---|---|---|
| 10,198,749 B1 | 2/2019 | Haskin | |
| 10,832,290 B1* | 11/2020 | Chennavasin | G06Q 30/0267 |
| 11,042,901 B1 | 6/2021 | Bebawy et al. | |
| 2001/0013011 A1 | 8/2001 | Day et al. | |
| 2001/0037250 A1* | 11/2001 | Lefkowitz | G06Q 30/0601 |
| | | | 705/5 |
| 2002/0143655 A1 | 10/2002 | Elston et al. | |
| 2002/0161670 A1 | 10/2002 | Walker et al. | |
| 2003/0101454 A1* | 5/2003 | Ozer | G06Q 30/02 |
| | | | 725/42 |
| 2003/0135463 A1 | 7/2003 | Brown et al. | |
| 2003/0171996 A1 | 9/2003 | Chen et al. | |
| 2003/0191709 A1 | 10/2003 | Elston et al. | |
| 2004/0034570 A1* | 2/2004 | Davis | G06Q 30/0229 |
| | | | 705/7.31 |
| 2004/0073485 A1* | 4/2004 | Liu | G06Q 30/0255 |
| | | | 705/14.27 |
| 2005/0144066 A1* | 6/2005 | Cope | G06Q 30/02 |
| | | | 705/14.25 |
| 2005/0171841 A1* | 8/2005 | Prorock | G06Q 30/0238 |
| | | | 705/14.26 |
| 2005/0197954 A1 | 9/2005 | Maitland et al. | |
| 2006/0036748 A1* | 2/2006 | Nusbaum | H04L 67/306 |
| | | | 709/228 |
| 2006/0064392 A1 | 3/2006 | Glisson | |
| 2006/0195385 A1 | 8/2006 | Khetrapal et al. | |
| 2006/0223508 A1 | 10/2006 | Starr et al. | |
| 2006/0237531 A1 | 10/2006 | Heffez et al. | |
| 2007/0192198 A1 | 8/2007 | Schwarz | |
| 2007/0250440 A1 | 10/2007 | Paulsen et al. | |
| 2007/0250441 A1 | 10/2007 | Paulsen et al. | |
| 2007/0270165 A1 | 11/2007 | Poosala | |
| 2008/0033805 A1 | 2/2008 | Padin | |
| 2008/0046334 A1 | 2/2008 | Lee et al. | |
| 2008/0065490 A1 | 3/2008 | Novick et al. | |
| 2008/0154714 A1* | 6/2008 | Liu | G06Q 30/02 |
| | | | 705/14.25 |
| 2008/0208688 A1* | 8/2008 | Byerley | H04M 15/8083 |
| | | | 705/14.39 |
| 2008/0262935 A1 | 10/2008 | Baumgartner et al. | |
| 2008/0275771 A1 | 11/2008 | Levine | |
| 2009/0030798 A1 | 1/2009 | Otto et al. | |
| 2009/0048884 A1 | 2/2009 | Olives et al. | |
| 2009/0076896 A1 | 3/2009 | DeWitt et al. | |
| 2009/0076925 A1 | 3/2009 | DeWitt et al. | |
| 2009/0138365 A1 | 5/2009 | Mueller et al. | |
| 2009/0319359 A1 | 12/2009 | Soza et al. | |
| 2010/0057628 A1 | 3/2010 | Trinidad et al. | |
| 2010/0076813 A1 | 3/2010 | Ghosh et al. | |
| 2010/0086107 A1* | 4/2010 | Tzruya | H04M 3/2281 |
| | | | 379/88.01 |
| 2010/0177343 A1 | 7/2010 | Shapiro et al. | |
| 2010/0274680 A1 | 10/2010 | Carlson et al. | |
| 2010/0306032 A1 | 12/2010 | Jolley | |
| 2011/0035288 A1 | 2/2011 | Clyne | |
| 2011/0087547 A1 | 4/2011 | Amaro et al. | |
| 2011/0093326 A1 | 4/2011 | Bous et al. | |
| 2011/0106605 A1* | 5/2011 | Malik | G06Q 30/02 |
| | | | 705/14.23 |
| 2011/0112897 A1 | 5/2011 | Tietzen et al. | |
| 2011/0119122 A1 | 5/2011 | Padam et al. | |
| 2011/0137689 A1* | 6/2011 | Chua | G06Q 50/01 |
| | | | 705/5 |
| 2011/0178899 A1* | 7/2011 | Huszar | G06Q 40/04 |
| | | | 705/27.2 |
| 2011/0191239 A1* | 8/2011 | Blackhurst | G06Q 30/0255 |
| | | | 705/39 |
| 2011/0238517 A1 | 9/2011 | Ramalingam et al. | |
| 2011/0246272 A1 | 10/2011 | Joa et al. | |
| 2011/0259672 A1 | 10/2011 | Kuo | |
| 2011/0302011 A1 | 12/2011 | Yoder et al. | |
| 2011/0313874 A1 | 12/2011 | Hardie et al. | |
| 2012/0005019 A1 | 1/2012 | LeBlanc et al. | |
| 2012/0016738 A1* | 1/2012 | Ouimet | G06Q 30/02 |
| | | | 705/14.46 |
| 2012/0094639 A1 | 4/2012 | Carlson et al. | |
| 2012/0130724 A1 | 5/2012 | Flegel et al. | |
| 2012/0143666 A1 | 6/2012 | Carrion et al. | |
| 2012/0209673 A1* | 8/2012 | Park | G06Q 30/02 |
| | | | 705/14.15 |
| 2012/0271827 A1 | 10/2012 | Merz | |
| 2012/0323681 A1 | 12/2012 | Bercaw | |
| 2013/0006776 A1 | 1/2013 | Miller et al. | |
| 2013/0132140 A1 | 5/2013 | Amin et al. | |
| 2013/0132246 A1 | 5/2013 | Amin et al. | |
| 2013/0132887 A1 | 5/2013 | Amin et al. | |
| 2013/0204697 A1 | 8/2013 | Boal | |
| 2013/0204791 A1 | 8/2013 | Dorsey et al. | |
| 2013/0246207 A1 | 9/2013 | Novak et al. | |
| 2013/0246301 A1 | 9/2013 | Radhakrishnan et al. | |
| 2013/0262204 A1* | 10/2013 | Stiles | G06Q 30/0211 |
| | | | 705/14.13 |
| 2013/0262211 A1 | 10/2013 | Tomlin et al. | |
| 2013/0276020 A1 | 10/2013 | Khan | |
| 2014/0058841 A1 | 2/2014 | Getchius | |
| 2014/0114777 A1 | 4/2014 | Guyot | |
| 2014/0122137 A1 | 5/2014 | Nelson et al. | |
| 2014/0122195 A1 | 5/2014 | Tabor et al. | |
| 2014/0129135 A1 | 5/2014 | Holden et al. | |
| 2014/0129302 A1 | 5/2014 | Amin et al. | |
| 2014/0129313 A1* | 5/2014 | Rappoport | G06Q 30/0224 |
| | | | 705/14.25 |
| 2014/0129951 A1 | 5/2014 | Amin et al. | |
| 2014/0164063 A1 | 6/2014 | Delrahim et al. | |
| 2014/0164083 A1 | 6/2014 | Wilkes | |
| 2014/0164093 A1* | 6/2014 | Libman | G06Q 30/0277 |
| | | | 705/14.39 |
| 2014/0172627 A1 | 6/2014 | Levy et al. | |
| 2014/0180767 A1 | 6/2014 | Villars | |
| 2014/0180867 A1 | 6/2014 | Zises | |
| 2014/0278883 A1* | 9/2014 | Wang | G06Q 30/0234 |
| | | | 705/14.26 |
| 2014/0279116 A1 | 9/2014 | Vasquez et al. | |
| 2015/0026006 A1 | 1/2015 | Jackson et al. | |
| 2015/0058088 A1 | 2/2015 | Unser et al. | |
| 2015/0095191 A1 | 4/2015 | Hu | |
| 2015/0095203 A1* | 4/2015 | Howe | G06Q 40/12 |
| | | | 705/30 |
| 2015/0134431 A1 | 5/2015 | Georgoff et al. | |
| 2015/0161645 A1* | 6/2015 | Unser | G06Q 30/0226 |
| | | | 705/14.27 |
| 2015/0206087 A1 | 7/2015 | Tavares | |
| 2015/0220945 A1 | 8/2015 | Iannace et al. | |
| 2015/0227975 A1* | 8/2015 | Momin | G06Q 30/0207 |
| | | | 705/14.1 |
| 2015/0278845 A1 | 10/2015 | Sorem et al. | |
| 2015/0379514 A1 | 12/2015 | Poole | |
| 2016/0063563 A1 | 3/2016 | Abad Fernandez et al. | |
| 2016/0247177 A1 | 8/2016 | Zamer | |
| 2016/0267533 A1 | 9/2016 | Seth et al. | |
| 2016/0300257 A1* | 10/2016 | Triano | G06Q 30/0211 |
| 2017/0286985 A1 | 10/2017 | Slavin et al. | |
| 2017/0293982 A1 | 10/2017 | Gupta et al. | |
| 2018/0012257 A1* | 1/2018 | Grimes | G06Q 30/0213 |
| 2018/0047083 A1 | 2/2018 | Agarwal et al. | |
| 2020/0005347 A1* | 1/2020 | Boal | G06Q 30/0245 |

OTHER PUBLICATIONS

Non-Final Office Action dated Sep. 12, 2014, for U.S. Appl. No. 14/284,856, of Perrone, G., et al., filed May 22, 2014.

Final Office Action dated Jan. 16, 2015, for U.S. Appl. No. 14/284,856 of Perrone, G., et al., filed May 22, 2014.

Non-Final Office Action dated Oct. 5, 2015, for U.S. Appl. No. 14/284,856, of Perrone, G., et al., filed May 22, 2014.

Non-Final Office Action dated Nov. 20, 2015, for U.S. Appl. No. 14/284,926, of Perrone, G., et al., filed May 22, 2014.

Final Office Action dated Jun. 21, 2016, for U.S. Appl. No. 14/284,926, of Perrone, G., et al., filed May 22, 2014.

(56) References Cited

OTHER PUBLICATIONS

Advisory Action dated Sep. 26, 2016, for U.S. Appl. No. 14/284,926, of Perrone, G., et al., filed May 22, 2014.
Final Office Action dated Nov. 25, 2016, for U.S. Appl. No. 14/284,856, of Perrone, G., et al., filed May 22, 2014.
Advisory Action dated Feb. 24, 2017, for U.S. Appl. No. 14/284,856, of Perrone, G., et al., filed May 22, 2014.
Non-Final Office Action dated May 22, 2017, for U.S. Appl. No. 14/284,926, of Perrone, G., et al., filed May 22, 2014.
Final Office Action dated Sep. 20, 2017, for U.S. Appl. No. 14/284,926, of Perrone, G., et al., filed May 22, 2014.
Non-Final Office Action dated Dec. 21, 2017, for U.S. Appl. No. 14/284,856, of Perrone, G., et al., filed May 22, 2014.
Non-Final Office Action dated Mar. 8, 2018, for U.S. Appl. No. 14/284,926, of Perrone, G., et al., filed May 22, 2014.
Final Office Action dated Jun. 27, 2018, for U.S. Appl. No. 14/284,856, of Perrone, G., et al., filed May 22, 2014.
"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.
Final Office Action dated Sep. 20, 2018, for U.S. Appl. No. 14/284,926, of Perrone, G , et al., filed May 22, 2014.
Ondrus, J., and Pigneur, Y., "An Architecture for Mobile Payments and Couponing in the Retail Industry," 17th Bled eCommerce Conference eGlobal, dated Jun. 21-23, 2004, pp. 1-15.
Ondrus, J., and Pigneur, Y., "Coupling Mobile Payments and CRM in the Retail Industry," IADIS International E-Commerce, edited by Nitya Karmakar & Pedro Isaas, Dec. 14-16, 2004, pp. 1-12.
Non-Final Office Action dated Oct. 4, 2019, for U.S. Appl. No. 15/610,156, of Bebawy, R., et al., filed May 31, 2017.
Non-Final Office Action dated Oct. 4, 2019, for U.S. Appl. No. 15/692,122, of Bebawy, R., et al., filed Aug. 31, 2017.
Final Office Action dated Mar. 31, 2020, for U.S. Appl. No. 15/610,156, of Bebawy, R., et al., filed May 31, 2017.
Final Office Action dated Mar. 31, 2020, for U.S. Appl. No. 15/692,122, of Bebawy, R., et al., filed Aug. 31, 2017.
Final Office Action dated Jan. 4, 2021, for U.S. Appl. No. 15/692,122, of Bebawy, R., et al., filed Aug. 31, 2017.
Advisory Action dated Jun. 9, 2020, for U.S. Appl. No. 15/692,122, of Bebawy, R., et al., filed Aug. 31, 2017.
Non-Final Office Action dated Aug. 6, 2020, for U.S. Appl. No. 15/610,156, of Bebawy, R., et al., filed May 31, 2017.
Non-Final Office Action dated Jul. 23, 2020, for U.S. Appl. No. 15/692,122, of Bebawy, R., et al., filed Aug. 31, 2017.
Advisory Action dated Mar. 12, 2021, for U.S. Appl. No. 15/692,122, of Bebawy, R., et al., filed Aug. 31, 2017.
Notice of Allowance dated Feb. 19, 2021, for U.S. Appl. No. 15/610,156, of Bebawy, R., et al., filed May 31, 2017.

* cited by examiner

TRANSACTION-BASED PROMOTION CAMPAIGN

BACKGROUND

Merchants often use promotion campaigns to encourage customers to purchase goods. A promotion campaign typically involves a single channel for publication, such as a newspaper or web-based advertisement. However, the single channel may limit a merchant's ability to contact a large portion of potential customers.

Some promotion campaigns can include more than one channel for publication, thereby increasing awareness of the promotion campaign among potential customers. However, current multi-channel promotion campaigns do not prevent abuses of the promotion campaign, such as by a customer receiving a coupon via each of the multiple channels and applying the coupons to multiple transactions. Such abuses can be extremely problematic in business, and can negate the benefits of the promotion campaign.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
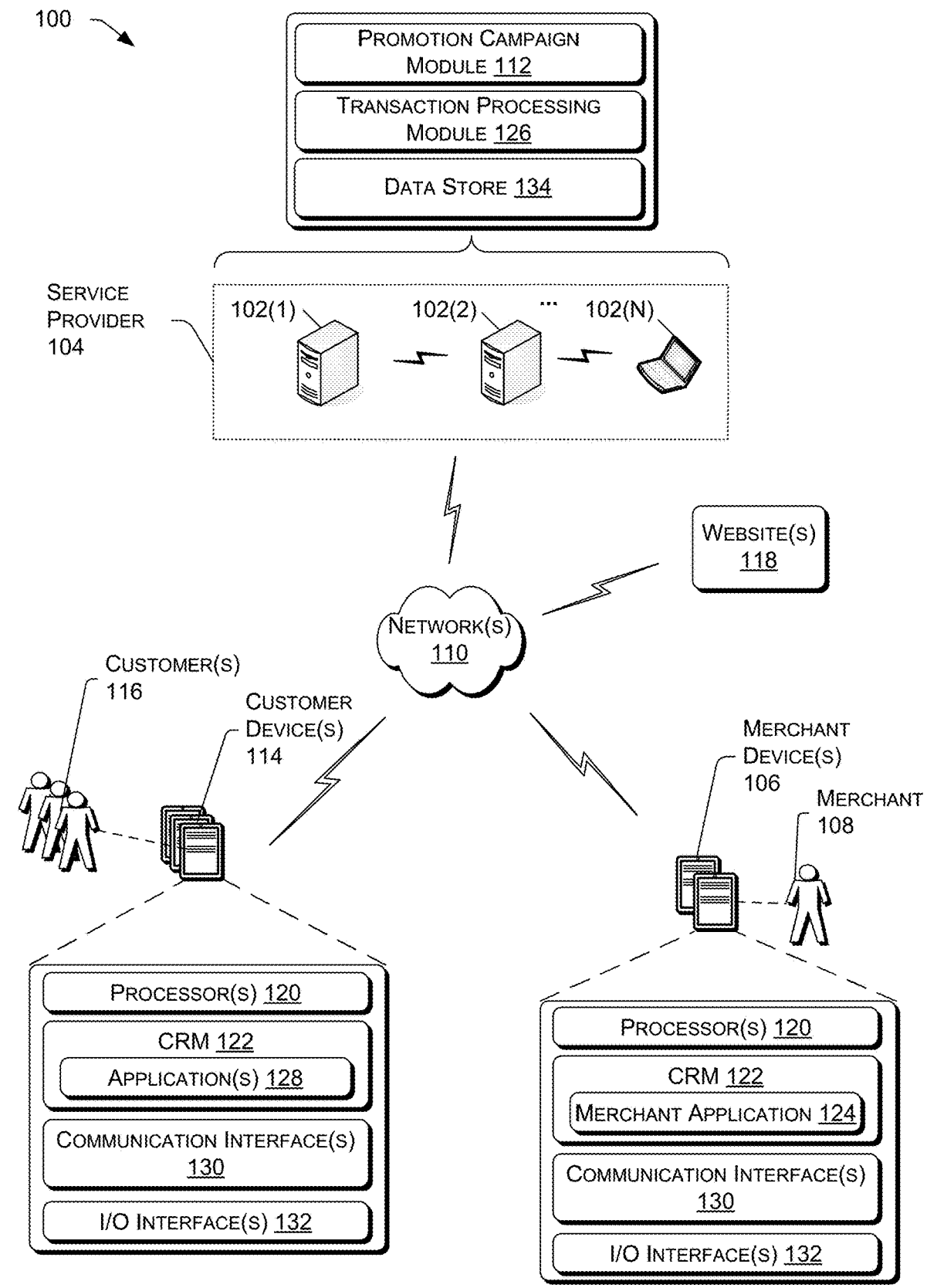
FIG. 1 illustrates an example environment in which a multi-channel promotion system can be used.

Some implementations described herein include techniques and arrangements for generating promotion campaigns for merchants and preventing multiple uses of the promotions offered therein. The promotions may include coupons, discounts, rewards, or the like associated with the merchants. The promotions may be distributed to customers via one or more channels. The channels may include electronic mail (e-mail), social media web sites, a merchant web site, an application, a receipt for a transaction, or the like. The promotions may include an identifier unique to a particular customer to whom it is directed. The unique identifier may be tracked by a promotion server to prevent multiple uses of a single promotion. In some examples, the promotions may be modified for a particular customer and/or group of customers, such as based on customer activity.

In various examples, the promotion server may receive a request from a merchant to generate a promotion campaign. The promotion campaign may include a promotion and/or an offer to receive a promotion. In some examples, the request may include criteria for the promotion campaign, such as a group of customers to whom the promotion will be initially delivered, one or more specified channels for delivery of the promotion and/or an offer for the promotion, a period of time associated with the promotion campaign, items to be offered, a discount for a transaction, and/or other information specified by the merchant for the promotion campaign. In some examples, the criteria may be determined based on merchant preferences stored on a merchant profile. In such examples, the promotion server may access the merchant profile to determine criteria for the promotion campaign. In some examples, the promotion server may determine one or more criteria based on a merchant transaction history stored in the merchant profile. For example, the promotion server may receive a request for a promotion campaign from a merchant, the promotion campaign including a discount for a transaction to be run in a subsequent week. The promotion server may access the merchant profile to identify frequent customers and/or loyalty program customers of the merchant and a preferred social media web site for publication. Based on the identification of recipients and a website, the promotion server may deliver the promotions to the frequent customers and/or loyalty program customers of the merchant and publish an offer for the promotion on the website.

In some examples, the promotion server may periodically generate a promotion campaign for a merchant based on the merchant preferences. In such examples, the merchant may specify a periodicity for the promotion campaign. For example, the merchant may include a preference to run a weekly promotion campaign starting every Monday. Based on the preference, the promotion server may automatically generate the weekly promotion campaign and distribute the promotions associated therewith.

In various examples, the promotion server may generate a promotion campaign for a merchant based on the merchant transaction history. In some examples, the promotion server may receive a request from a merchant to generate a promotion campaign based on the merchant transaction history, such as a decrease in sales during a current time period. In some examples, the promotion server may be configured to monitor the number and/or amount of transactions conducted by the merchant in the current time period, as compared to a previous time period. Responsive to a determination that the number and/or amount of transactions in the current time period is less than in the previous time period, the promotion server may automatically generate a promotion campaign to boost sales in the current time period. In some examples, the promotion server may be configured to identify customers who have previously conducted transactions with the merchant, but have not conducted a transaction during the current time period. In such examples, the promotion server may initially direct the promotion campaign to the customers who have not conducted transactions in the current time period.

In some examples, the promotion server may be configured to identify customers who have conducted transactions in both the previous time period and the current time period, and may initially direct the promotion campaign to the identified customers, as a loyalty reward, for example. In some examples, the promotion server may be configured to identify new customers of the merchant, and may initially direct the promotion campaign to the new customers, in order to boost sales.

The promotion campaign may include promotions and/or offers for promotions associated with a merchant. In various examples, the promotion server may generate a first set of promotions for delivery to a first set of customers. As discussed above, the first set of customers, or customers to whom the promotion campaign is initially directed, may be determined by the merchant and/or the promotion server, based on an association with the merchant (e.g., loyalty program, frequent customer, new customer, etc.). In some examples, the promotions may be individually tailored for each of the first set of customers. In such examples, the promotion server may access a customer profile to determine one or more customer preferences and/or a customer transaction history. The promotion server may then use the one or more customer preferences and/or customer transaction history to determine one or more criteria for an individualized promotion. For example, the promotion server may determine, based on a customer transaction history, that a customer typically takes four weeks to redeem the promotion (e.g., apply the promotion to a transaction). Based on the determination, the promotion server may generate a promotion for the customer with an expiration date four weeks from a start date while other customers may have a shorter expiration period. For another example, the promotion server may determine, based on the one or more customer preferences, that a customer typically purchases a large coffee with a donut at a merchant. Based on the determination, the promotion server may generate a promotion for the customer, the promotion including a coupon for a free large cup of coffee.

In some examples, each promotion of the first set of promotions may include an identifier associated with respective customers of the first set of customers. The identifier may include a telephone number, a username for receiving short message system (SMS) messages, an electronic mail (email) address, or another type of identifier for linking a promotion to a customer. For example, a customer with an email address of customer@mail.com may be identified as a recipient of a promotion. The promotion server may include the identifier "customer@mail.com" in the promotion prior to delivery.

Additionally or alternatively, the promotion server may generate an offer to receive a promotion. In various examples, the promotion server may publish the offer to receive the promotion on a website, an application, and/or another electronic channel. In some examples, the promotion server may publish the offer to receive the promotion on a receipt for a transaction with the merchant, such as a digital receipt.

In various examples, to redeem the offer to receive the promotion, a user may select a hyperlink associated with the offer published on a website, a mobile application, a digital receipt, or another electronic channel. Responsive to the selection of the hyperlink, the user may be directed to input a means of communication, such as an email address, number for SMS messages, or the like. In various examples, the promotion server may receive the input, and may generate a promotion including the means of communication as an identifier. In such examples, the promotion server may send the promotion to the user, via the means of communication.

In some examples, the promotion server may receive the input, and may determine that the customer associated with the input previously received the promotion. In some examples, a determination that the customer previously received the promotion may be based on input matching an identifier of the promotion previously sent to the customer.

In some examples, the determination may be based on the input being associated with the customer who previously received the promotion. For example, the promotion server may receive an indication of selection of an offer via a social media website, and an input of a number 999-567-8910 as a means of communication. The promotion server may receive the input, and may identify the number as a number associated with a customer who previously received the promotion via the email address customer@mail.com.

In some examples, responsive to an identification that the customer has previously received the promotion, the promotion server may cause a notification to display on a customer device of the customer indicating that the promotion had previously been sent to the customer. In some examples, the notification may include the particular means of communication through which the promotion was originally sent. In some examples, the notification may include a selectable option for the customer to cause the promotion to be sent again via the original means of communication. In some examples, the notification may include a means by which the customer can have the promotion resent via a different means of communication. Responsive to an indication that the customer requests the promotion to be resent, the promotion server may access the previously sent promotion including the identifier associated with the customer, and can send it via original means of communication and/or a different means of communication (e.g., an alternate contact identifier).

The systems, methods, and devices described herein may improve technologies associated with network communications. For example, the systems, methods, and devices may decrease a number of times a promotion is sent via a network, such as to a particular customer. A decrease in the number of times a promotion is sent may directly result in an increase in bandwidth available for other communications.

Additionally, the techniques described herein may improve the functioning of at least a customer computing device, such as by decreasing an amount of data processed by the customer computing device and increasing an amount of processing capability and/or storage capability available of the customer computing device. For example, a traditional promotion campaign system may receive an indication that a customer has selected an offer for the promotion. Based on the indication, the traditional promotion campaign may send the customer a promotion, such coupon or discount specified in the offer. In some cases, the traditional promotion campaign may send the customer multiple copies of the same promotion via different channels, such as email, a website, mobile application, a digital receipt, etc.

Unlike the traditional promotion campaign system, the promotion server described herein may link a customer to a particular promotion provided thereto, to prevent multiple copies of the same promotion being sent to the customer. The prevention of multiple transmissions of the same promotion to a particular customer computing device may decrease the amount of data processed by the customer computing device and increase the amount of processing capability and/or storage capability available of the customer computing device. Thus, the techniques described herein may improve the functioning of the customer computing device. Additionally, the prevention of multiple transmissions of the same promotion to a particular may decrease the amount of data processed by the server device. Thus, the techniques described herein may improve the functioning of the server device.

FIG. 1 illustrates an example environment 100 in which a multi-channel promotion system may be used to generate, distribute, and manage promotion campaigns. For instance, the environment 100 can enable one or more service computing devices 102 of a service provider 104 (e.g., promotion server) to receive promotion information from one or more merchant devices 106 of a merchant 108 over one or more networks 110. Based on the promotion information, the service provider 104 may generate a promotion campaign, such as via a promotion campaign module 112. The service provider 104 may then distribute promotions and/or offers for a promotion of the promotion campaign to one or more customer devices 114 of one or more customers 116 and/or may publish an offer for the promotion on a website 118, via the network(s) 110.

The service computing devices 102, the merchant device(s) 106, and the customer device(s) 114 may include any suitable type of computing device, e.g., mobile, semi-mobile, semi-stationary, or stationary. Some examples of the service computing devices 102, the merchant device(s) 106, and the customer device(s) 114 may include mobile phones, tablet computers, mobile phone tablet hybrids, personal data assistants (PDAs), laptop computers, media players, personal video recorders (PVRs), cameras, wearable computers, and any other mobile computers or semi-mobile computers configured to communicate via a network 110, desktop computers, server computers or blade servers such as web-servers, map-reduce servers, or other computation engines or network-attached storage units, and any other type of semi-stationary or stationary computing devices configured to communicate via the network 110.

The network(s) 110 can include any type of wired and/or wireless network, such as local area networks (LANs), wide area networks (WANs), personal area networks (PANs) (e.g., Bluetooth®, etc.), body area networks (BANs), near field communication (NFC), satellite networks, cable networks, Wi-Fi networks, WiMax networks, mobile communications networks (e.g., 3G, 4G, and so forth) or any combination thereof. The network(s) 110 can utilize communications protocols, including packet-based and/or datagram-based protocols such as internet protocol (IP), transmission control protocol (TCP), user datagram protocol (UDP), or other types of protocols. Moreover, the network(s) 110 can also include a number of devices that facilitate network communications and/or form a hardware basis for the networks, such as switches, routers, gateways, access points, firewalls, base stations, repeaters, backbone devices, and the like.

Various components of the service computing device will be discussed in greater detail below with respect to FIG. 8. The merchant device(s) 106, and the customer device(s) 114 may additionally each include one or more processors 120 and one or more computer-readable media (CRM) 122. Each processor may itself comprise one or more processors or processing cores. For example, the processor(s) 120 may be implemented as one or more microprocessors, microcomputers, microcontrollers, digital signal processors, central processing units, state machines, logic circuitries, and/or any devices that manipulate signals based on operational instructions. In some cases, the processor(s) 120 may be one or more hardware processors and/or logic circuits of any suitable type specifically programmed or configured to execute the algorithms and processes described herein. The processor(s) 120 may be configured to fetch and execute computer-readable processor-executable instructions stored in the CRM 122.

Depending on the configuration of the merchant device(s) 106 and/or the customer computing device(s) 114, the CRM 122 may be an example of tangible non-transitory computer storage media and may include volatile and nonvolatile memory and/or removable and non-removable media implemented in any type of technology for storage of information such as computer-readable processor-executable instructions, data structures, program modules or other data. The CRM 122 may include, but is not limited to, RAM, ROM, EEPROM, flash memory, solid-state storage, magnetic disk storage, optical storage, and/or other computer-readable media technology. Further, in some cases, the merchant device(s) 106 and/or the customer computing device(s) 114 may access external storage, such as RAID storage systems, storage arrays, network attached storage, storage area networks, cloud storage, or any other medium that can be used to store information and that can be accessed by the processor(s) 120 directly or through another computing device or the network 110. Accordingly, the CRM 122 may be computer storage media able to store instructions, modules or components that may be executed by the processor(s) 120. Further, when mentioned, non-transitory computer-readable media excludes media such as energy, carrier signals, electromagnetic waves, and signals per se.

The CRM 122 may be used to store and maintain any number of functional components that are executable by the processor(s) 120. In some implementations, these functional components comprise instructions or programs that are executable by the processor(s) 120 and that, when executed, implement operational logic for performing the actions and services attributed above to the respective devices 106 and 114. Functional components of the merchant device 106 stored in the CRM 122 may include a merchant application 124.

In various examples, the merchant application 124 may be configured to process transaction data, for a transaction between the merchant 108 and a customer 116. The transaction data may include an identity of the merchant 108, and identity of the customer 116, a time associated with the transaction, one or more items to be purchased in the transaction, an amount of the transaction, payment instrument information used to pay for the transaction, promotion redemption information, etc. The merchant application 124 may transmit the transaction data to a transaction processing module 126 of the service provider 104. The transaction processing module 126 may be configured to process the transaction data, and determine whether the transaction may be approved. In various examples, the transaction processing module 126 may transmit approval to the merchant application 124.

Additionally or in the alternative, the transaction processing module 126 may be configured to transmit approval of a transaction to the customer device 114, such as in the form of a digital receipt for the transaction. In various examples, the customer may receive the digital receipt via email, SMS message, or other messaging system. In some examples, the customer 116 may receive the digital receipt via one or more application(s) 128 (e.g., mobile application) stored on the CRM 122 of the customer device 114. In such examples, the application(s) 128 may include a merchant application, such as merchant application 124. In some examples, the application(s) 128 may include a social media application, or other type of application configured to facilitate communication with the website(s) 118.

In some examples, the application 128 may facilitate access to and/or storage of a promotion and/or an offer for a promotion of a promotion campaign. In such examples, the customer 116 may access the promotion and/or offer for the promotion for the merchant 108 via the application 128. The promotion and/or offer for the promotion may be accessible by the application 128 associated with the customer 116 (i.e., via a customer account) by the merchant application 124 on the merchant device 106, the promotion campaign module 112 on the service computing devices 102, and/or the website 118 via the network 110.

Communications via the network 110 may be facilitated by one or more communication interfaces 130 on the service computing device(s) 102 (not illustrated), the merchant device(s) 106, and the customer device(s) 114. The communication interface(s) 130 may include one or more interfaces and hardware components for facilitating communication with various other devices over a network or directly. For example, communication interface(s) 130 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In various examples, the merchant device(s) 106 and the customer device(s) 114 may include one or more input/output (I/O) interfaces 132. I/O interface(s) 132 may include various user controls (e.g., buttons, a keyboard, a keypad, touch screen, etc.), speakers, a microphone, a camera, a haptic output device, and so forth. In some examples, the I/O interface(s) 132 may facilitate access to a promotion and/or offer for a promotion on the customer device(s). In some examples, the I/O interface(s) 132 may facilitate input of transaction data. In such examples, the merchant 108 and/or the customer 116 may input transaction data for transmission to the transaction processing module 126. In various examples, the I/O interface(s) 132 may facilitate input of promotion information. In such examples, the promotion information may be input by the merchant 108 and/or customer(s) 116 (i.e., customer preferences in a customer profile) and sent to the campaign promotion module 112 for processing in promotion campaign generation.

In various examples, the promotion information may include a request to generate a promotion campaign. The promotion campaign may include a promotion (e.g., coupon, discount, reward, etc.) and/or an offer for the promotion. In some examples, the request to generate the promotion campaign may include criteria for the promotion campaign. In such examples, the criteria may include a time period and/or range of dates in which to run the promotion campaign (e.g., start data, expiration date, a specified day of validity, etc.), a group of customers 116 to whom the promotion campaign may be initially delivered (e.g., loyalty program members, frequent customers, new customers, etc.), an item to be discounted, an amount of a discount, or the like. In some examples, the criteria may include one or more channels through which the service provider 104 may deliver a promotion and/or publish an offer for a promotion to encourage a customer 116 to conduct a transaction with a merchant 108. The channels may include electronic mail, SMS messages, website(s) 118 (e.g., social media websites, a merchant website, etc.), an application 128, a receipt for a transaction, or the like.

Additionally or alternatively, the merchant 108 may send one or more of the criteria to the service provider 104 as one or more merchant preferences. The merchant preference(s) may be stored on the service computing device(s) 102, such as in a data store 134. In various examples, the preference(s) may be stored in a merchant profile on the data store 134. For example, the merchant 108 may designate, as a merchant preference, email as a first channel for publication of the promotion campaign, and a social media web site, such as Facebook®, as a second channel publication of the promotion campaign. Based on the merchant preferences, the service provider 104 may automatically designate the first channel and the second channel as channels for a promotion campaign generated for the merchant 108.

In various examples, one or more of the criteria may be determined based on one or more customer preferences and/or a customer transaction history of the customer(s) 116. In such examples, the customer preference(s) and/or the customer transaction history may be stored in a customer profile on the data store 134. For example, the service provider 104 may have a default expiration for promotion campaigns set at one week from issuance. However, the service provider 104 may access a customer transaction history for a particular customer 116 and determine that the particular customer 116 takes an average of two weeks to apply the promotion to a transaction. Based on the customer transaction history, the service provider 104 may dynamically alter the expiration date of a promotion sent to the particular customer 116 from one week to two weeks from issuance. For another example, the merchant 108 may request that the service provider 104 generate a promotion campaign for rewards program members, the promotion campaign including discounts for items offered by the merchant. The service provider 104 may access the customer transaction history associated with a first member and a second member of the rewards program, and may determine a first item and a second item that are frequently purchased by the respective members. The service provider 104 may generate a first promotion for the first member including a discount on the first item, and a second promotion for the second member including a discount on the second item.

In some examples, the one or more of the criteria may be determined based on default settings for promotion campaigns, as determined by the service provider 104 and/or a manager thereof. In such examples, the default settings may be used, absent an indication to the contrary, such as in the request for a promotion campaign, as a merchant preference, customer preference, transaction history, or the like. For example, the service provider 104 may include a default setting of one week for the expiration of a promotion campaign. The service provider 104 may then generate promotions and/or offers for a promotion that expire one week from a start date of the promotion campaign.

As stated above, the service provider 104 may generate a promotion campaign via the promotion campaign module 112. The promotion campaign module 112 may generate a promotion to be delivered to the customer(s) 116. As discussed above, the recipients of the promotion may be determined based on the criteria for the promotion campaign. In various examples, individual promotions of the promotion campaign may be linked to respective customer(s) 116 to whom it will be delivered. In some examples, the link may include an identifier associated with the respective customer(s) 116. The identifier may include an email address, a phone number, an SMS number, a reward program number, or another identifier associated with the customer 116.

In various examples, after generating the promotion, and at the start of the promotion campaign, the promotion campaign module 112 may distribute the promotion to the customer(s) 116. In various examples, the promotion may be distributed based on the identifier. For example, an identifier of a promotion may be an email address of the customer 116, and the promotion may be distributed to the customer via email at the email address. In some examples, the promotion may be delivered via a channel not associated with the identifier. For example, an identifier of a promotion may be an email address of the customer 116, however the customer and/or merchant may specify that the promotion be transmitted via SMS message. The service provider 104 may thus identify an SMS number associated with the customer 116, and send the promotion via the SMS number.

Additionally or alternatively, the promotion campaign module 112 may generate an offer for a promotion. As will be discussed in greater detail below with regard to FIG. 2, the offer for the promotion may include information associated with the promotion (e.g., merchant name, expiration of the offer, etc.), and an instruction on how to accept the offer (e.g., click here to accept) to receive the promotion. In some examples, the promotion campaign module 112 may cause the offer for the promotion to be published via website(s) 118. The website(s) 118 may include social media websites (e.g., Facebook®, Twitter®, Pinterest®, Snapchat®, or the like), a merchant website, and/or other websites. The customer(s) 116 may access the website(s) 118, for example, on the customer devices 114 via the communication interface 130. In some examples, the customer(s) 116 may access the website(s) 118 via the application 128.

In some examples, the promotion campaign module 112 may cause the offer for the promotion to be published via a receipt for a transaction (e.g., digital receipt) between the merchant 108 and a customer 116. In some examples, the receipt may include the information associated with the promotion and/or an instruction on how to accept the offer (e.g., click here to accept) to receive the promotion. In some examples, the receipt may include an electronic receipt. In such examples, the offer may include a hyperlink, or other means by which the customer 116 may select to accept the offer. In some examples, the receipt may include a printed receipt. In such examples, the receipt may include a web address for the customer to visit to receive the promotion. Responsive to visiting the website 118, the customer 116 may be provided an option to select to accept the offer.

In some examples, responsive to receiving an indication of an acceptance of the offer, the promotion campaign module 112 may cause a user interface to surface on the customer device 114 for the customer 116 to provide an identifier. The identifier may be a phone number, email address, or means of communication associated with the customer. The customer 116 may input the identifier via the I/O interface 132, and the identifier may be sent to the service provider 104. The service provider may process the identifier and determine whether it is associated with one of the promotions that was previously sent to the group of customers 116. Responsive to a determination that the identifier is not associated with any of the previously sent promotions, the promotion campaign module 112 may link the identifier to the customer 116, and send a promotion to the customer device 114, such as via the identifier.

In some examples, the promotion campaign module 112 may determine that the identifier is associated with a previously sent promotion. In some examples, the determination may be based on the identifier matching an identifier or a previously delivered promotion. In some examples, the determination may be based on the identifier being associated with a customer profile corresponding to a customer 116 who previously received a promotion, the promotion including a second identifier. For example, a customer may receive a discount coupon via email, and later receive an offer for the same discount coupon via a receipt. The customer may accept the offer for the promotion, in an attempt to receive a second discount coupon, may input a phone number as an identifier. The promotion campaign module 112 may access the customer profile in the data store 134, and may determine that the email address and phone number identifiers are associated with the same customer.

Responsive to a determination that the identifier is associated with a previously sent promotion, the promotion campaign module 112 may generate a notification to inform the customer 116 that a promotion was previously sent to the customer 116. In some examples, the notification may include an identifier corresponding to the delivery. For example, the notification may include the particular email address to which the promotion was sent. In some examples, the notification may include an offer to resend the promotion that was previously sent. Responsive to selecting the offer to resend, the promotion campaign module 112 may send the same campaign, linked to the customer, to the identifier. In some examples, the notification may include an additional option for the customer 116 to select an alternate identifier and/or channel for delivery. For example, an email account to which the promotion was originally sent may be disabled. The customer may thus be able to provide another email address, SMS number, or the like, to which the service provider may send the promotion. In some examples, if an alternate identifier is provided, the promotion campaign module 112 may save the alternate identifier in the data store 112, such as on the customer's profile.

In various examples, the customer may redeem the promotion during a transaction with the merchant 108, in order to apply the promotion to the transaction. In some examples, the merchant 108 may apply the promotion to the transaction, and may send the identifier, and/or another code specific to the promotion, to the service provider 104. In such examples, the service provider 104 may mark the promotion associated with the customer 116 as redeemed. In various examples, after redemption of a promotion, the notification described above may include an indication that the promotion was redeemed.

Figure 2:
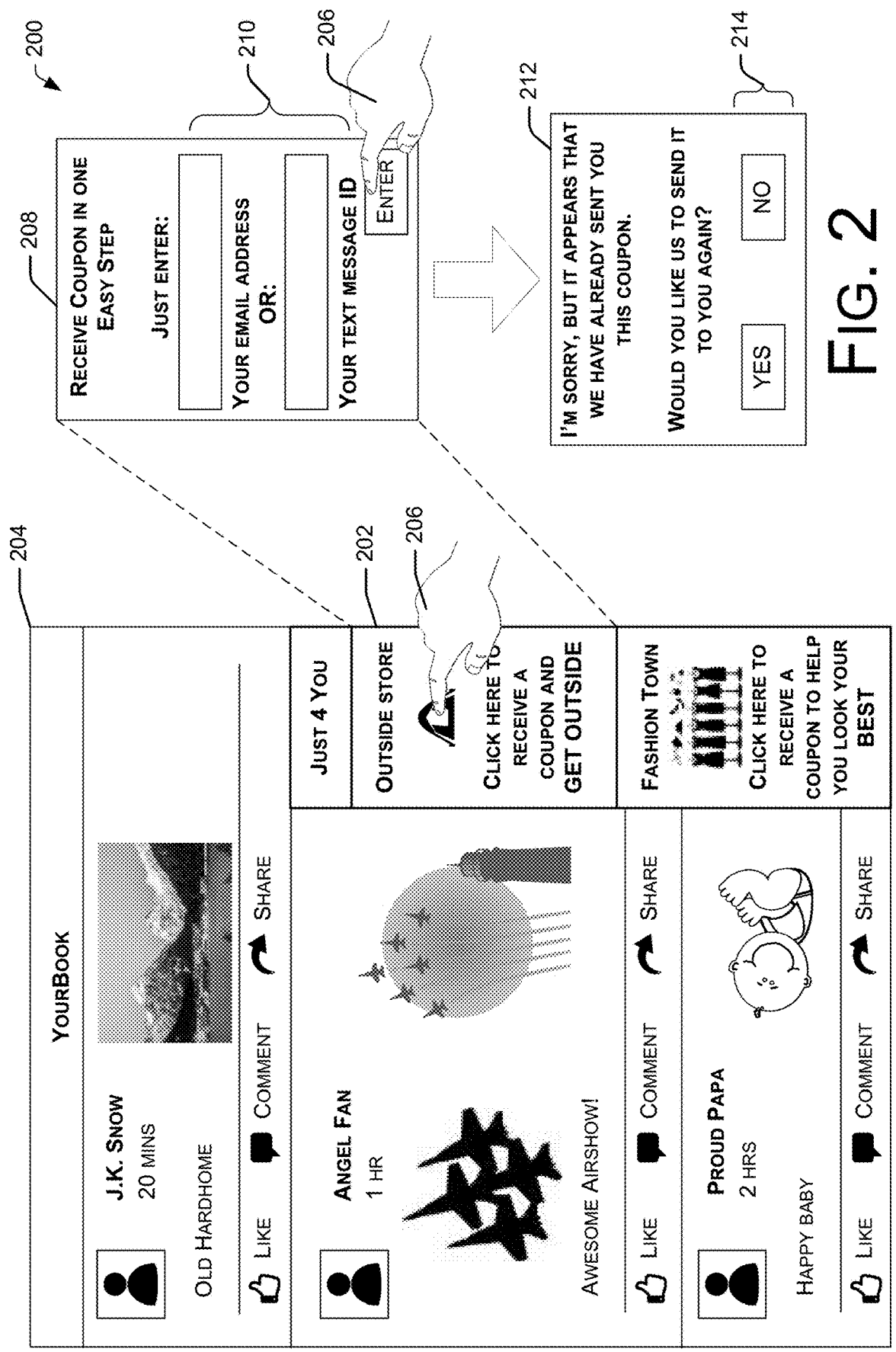
FIG. 2 illustrates an example social media channel of the multi-channel promotion system.

FIG. 2 illustrates an example channel 200 for publication of an offer 202 to receive a promotion of the multi-channel promotion system. In some examples, the channel 200 may include a single channel for publication of an offer 202. In some examples, the channel 200 may include one of two or more channels for publication of the offer 202 and/or a promotion associated with the offer 202. For example, the promotion may be distributed to a group of customers via email and the offer 202 may be published via the channel 200. In some examples, the distribution and/or publications may occur substantially simultaneously. In some examples, the distribution and/or publication may occur in order, such as distribution first, publication second.

In the illustrative example, the channel 200 includes a social media website, YourBook. In other examples, the channel 200 may include a merchant website, or another website, such as website 118. In some examples, the channel 200 may include an application, such as application 128. In various examples, the channel 200 may be accessed via an application on a customer device, such as application 128. In various examples, the channel 200 may include a user interface 204, configured to enable the customer 206 to select the offer 202 (e.g., accept the offer).

In various examples, the offer 202 may include a merchant name and an instruction on how to accept the offer 202 and receive the promotion, illustrated as "click here to receive a coupon." In some examples, the offer 202 may include more information, such as an amount and/or item associated with the promotion, a time period associated with the promotion, or the like.

In various examples, responsive to receiving an indication of a selection of the offer 202, the user interface 204 may surface a window 208. In some examples, the window 208 may be displayed on top (e.g., covering) at least part of the user interface 204. In some examples, the window 208 may be displayed as a separate window 208. In some examples, the window 208 may include an instruction to input an identifier 210. In the illustrative example, the menu 208 includes an option for the customer 206 to input either an email address or a text message identifier 210. In other examples, the window 208 may include the option to input other types of identifiers 210, such as a phone number, rewards number or the like. In some examples, the window 208 may require two or more identifiers 210 of the customer 206 to be input in order to receive the promotion.

In various examples, based on the customer 206 inputting the identifier 210 into the window 208 and selecting enter, the computing device associated with the user interface 204 may send the identifier 210 to the service provider as an indication of selection of the offer. The service provider may process the identifier and determine whether it is associated with one of the promotions that was previously sent to the customer associated with the identifier. In some examples, the determination may be based on the input identifier 210 matching an identifier associated with a previously sent promotion. In some examples, the determination may be based on the input identifier 210 being associated with a customer who previously received the promotion, such as an association in a customer profile. Based a determination that the identifier 210 is not associated with a previously sent promotion, the service provider may link the identifier to the customer 206, and send a promotion comprising the identifier, to a customer device associated with the customer 206, such as via the identifier.

Based on a determination that the identifier 210 is associated with a customer who previously received the promotion, service provider may generate a notification 212 to inform the customer that the promotion was previously sent. In some examples, the service provider may cause the user interface 204 on the customer device to surface the notification 212, such as in a second window. In some examples, the notification 212 may replace the window 208. As illustrated in FIG. 2, the notification may include a message indicating that the coupon has previously been sent. Though illustrated as "I'm sorry, but it appears that we have already sent you this coupon," the message may include any type of word or pictorial communication to indicate that the coupon was previously sent. In some examples, the notification 212 may additionally include the identifier corresponding to the coupon. In other words, the notification 212 may include the specific means of delivery of the coupon. In some examples, the notification 212 may include a selectable option 214 to cause the coupon to be resent.

Based on receiving an indication that the customer 206 selected the option 214 to resend, the service provider may send the same coupon, linked to the customer, to the original identifier. In some examples, the notification 212 may include an additional option for the customer 206 to select an alternate identifier and/or channel for delivery. The customer may thus be able to provide another email address, SMS number, or the like, to which the service provider may send the coupon. In some examples, if an alternate identifier is provided, the service provider may save the alternate identifier to a customer profile associated with the customer 206.

Figure 3:
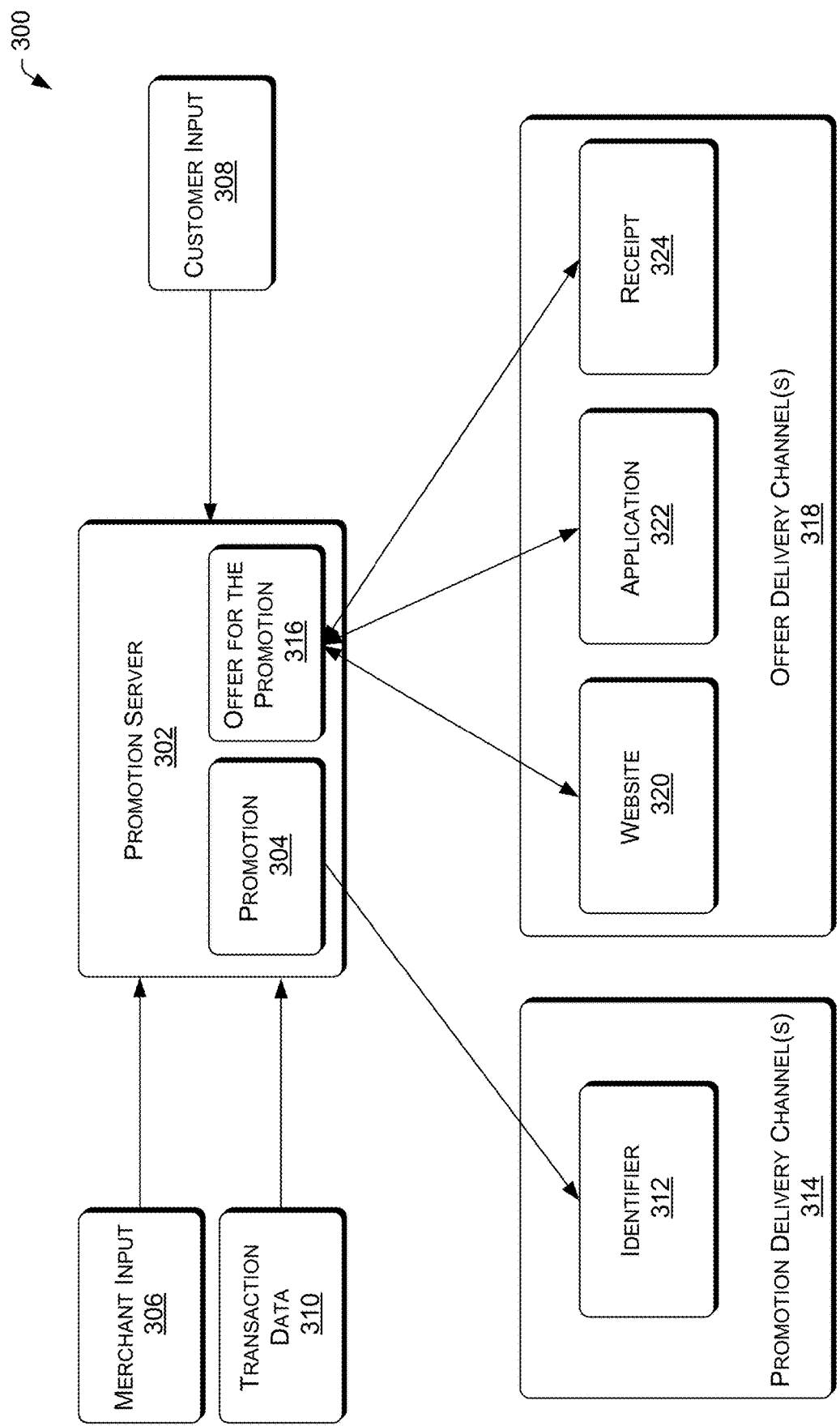
FIG. 3 illustrates an example system for generating a multi-channel promotion.

FIG. 3 illustrates an example system 300 for generating, distributing, and managing a multi-channel promotion. As discussed above, the promotion server 302, such as service provider 104, may be configured to generate a promotion campaign for a merchant. The promotion campaign may include one or more promotions 304. The promotion(s) 304 may include coupons, discounts, rewards, or other means to encourage a customer to conduct a transaction with the merchant.

In various examples, the promotion server 302 may generate the promotion campaign(s) and/or the promotion(s) 304 based on merchant input 306. In various examples, the merchant input 306 may include a request to generate a promotion campaign. In such examples, the request may include one or more criteria for the promotion campaign. The criteria may include a time period and/or range of dates in which to run the promotion campaign (e.g., start data, expiration date, a specified day of validity, etc.), a group of customers to whom a promotion of the campaign may be delivered (e.g., loyalty program members, frequent customers, new customers, etc.), an item to be discounted, an amount of a discount, or the like. In some examples, the criteria may include one or more channels through which the service provider may publish the promotion and/or an offer for the promotion. The channels may include electronic mail, SMS messages, web site(s) (e.g., social media web sites, a merchant web site, etc.), a receipt for a transaction, or the like.

Additionally or alternatively, the merchant input 306 may include one or more merchant preferences regarding one or more promotion campaigns. In various examples, the merchant preference(s) may be associated with a merchant account with the promotion server 302. In such examples, the merchant preference(s) may be stored to a data store of the promotion server 302, such as in a merchant profile. In some examples, the merchant preference(s) may include one or more criteria to be used as default criteria for promotion campaigns associated with the merchant. For example, the merchant input 306 may include a merchant preference to generate a monthly promotion campaign, offering a ten percent discount coupon as a promotion of the promotion campaign. The merchant input 306 may additionally specify rewards customers to whom the discount coupon should be initially sent, as well as a particular web site for publication of an offer to receive the promotion coupon. Based on the merchant preferences, the promotion server 302 may generate, distribute and manage the monthly promotion campaigns.

In various examples, the promotion server 302 may generate the promotion(s) 304, at least in part, based on customer input 308. In such examples, the customer input 308 may include one or more customer preferences. The customer preferences may include preferred merchants, preferred discounts, preferred items, and/or other customer preferences with regard to one or more merchants. In various examples, the customer preferences may be stored on the data store of the promotion server 302, such as in a customer profile. In some examples, the promotion server 302 may generate a promotion campaign for a particular merchant, and may identify a customer specified by the merchant criteria as a customer having preferences stored on a customer profile. In such examples, the promotion server 302 may tailor the promotion for the customer based on the one or more preferences. For example, a merchant input may designate email as a channel for an initial distribution of the promotion 304. The promotion server 302 may access a customer profile associated with a customer and determine that the customer prefers for promotions to be sent via SMS. The promotion server 302 may send the promotion to the customer via SMS, and to other customers via email.

Additionally or alternatively, the promotion server 302 may generate the promotion campaign and/or the promotion(s) 304 based on transaction data 310. The transaction data 310 may be provided to the promotion server 302 from the merchant device and/or a customer device. The transaction data 310 may include a time associated with each transaction, a frequency of transactions between the merchant and customer(s), amounts for each transaction, items purchased, promotion redemption information (e.g., a number of promotions redeemed versus a number issued or claimed), a success rate of transactions with customer(s) (e.g., percentage of transactions approved), and/or other information relevant to the transactions. In some examples, the transaction data 310 may include previous promotional activity, such as the redemption of a previous promotion by a customer and/or a group of customers. For example, the transaction data 310 may include a retail price for an item and a previously issued promotion (i.e., promotion from a previous promotion campaign) applied to the transaction. The promotion may include a unique identifier that ties the transaction and/or promotion to a particular customer. The promotion server 302 may store the transaction data 310 with data associated with the particular customer.

In various examples, the transaction data 310 may be stored on the promotion server 302 as a transaction history. In such examples, the transaction history may be stored on a merchant profile and/or customer profiles. The transaction history may include transaction data for the merchant (merchant transaction history) and with respect to a customer (customer transaction history). In some examples, the customer transaction history may include transaction data corresponding to transactions between the customer and one or more merchants. For example, the customer transaction history may include an average time of day in which the customer conducts transactions, one or more items commonly purchased by the customer, an average amount of money spent on transactions with a particular merchant, an average amount of money spent on transactions with one or more other merchants, an average time for the customer to redeem promotions. In some examples, the merchant transaction history may include transaction data corresponding to transactions between the merchant and a plurality of customers.

In some examples, the merchant transaction history may be monitored by the promotion server 302. In such examples, the promotion server may identify changes (e.g., increases, decreases, etc.) to the transaction data 310 over a given period (e.g., weekly, monthly, etc.) and/or from one period to one or more other period (e.g., this week compared to last week). In some examples, the time period may be specified by the merchant, such as in the merchant profile. In some examples, the time period may be set by the promotion server 302. In various examples, the promotion server 302 may generate the promotion campaign based on the changes. For example, the promotion server 302 may monitor the transaction history of a particular merchant and determine that, on Wednesday, the weekly revenue of the particular merchant is 20% than it was on Wednesday of the previous week. Based on the determination that revenue is down, the promotion server 302 may generate a promotion campaign. In some examples, the merchant may determine the changes, and may send a request to the promotion server 302 to generate a promotion campaign. In some examples, the merchant may specify the changes and/or promotion campaign criteria in the request.

In some examples, the promotion campaign may be directed (initially or entirely) to one or more customers based on merchant specified criteria, such as merchant preferences or default settings. In various examples, the promotion campaign may be directed (initially or entirely) to customers who had conducted transactions with the merchant in the period and/or one or more other periods of interest. In some examples, the promotions may be directed to (i.e. include identifiers of) customers who conducted transactions in a first time period, but not in a second time period. In such examples, the promotion server 302 may filter the transaction history for the merchant over the first time period and the second time period, and may identify customers who did not, or have not yet, returned for another transaction during the second time period. In some examples, the first time period and/or the second time period may include a promotional time period or a non-promotional time period. The promotion server 302 may generate promotions 304 directed to the identified customers. In some examples, the promotions may be directed to customers who conducted transactions both in the first time period and the second time period. In such examples, the promotion server 302 may filter the transaction history for the merchant over the first time period and the second time period, and may identify customers who conducted transactions in both time periods. In some examples, the promotions may be directed to one or more new customers. In such examples, the promotion server 302 may identify one or more new customers based on the one or more customers conducting a transaction with the merchant for a first time over the merchant transaction history.

In some examples, the promotion server 302 may access the customer profiles and/or customer transaction histories of identified customers, and may generate the respective promotions based on one or more customer preferences and/or the customer transaction histories. In various examples, the promotion server 302 may alter timing of a redemption period and/or delivery of the promotion 304 to the customer to increase a probability that that the customer will redeem the promotion 304. In some examples, the promotion server 302 may filter the customer profiles and/or customer transaction histories to determine a length of time for a redemption period. In such examples, the promotion server 302 may determine an average time it takes for one or more customers to redeem promotions after receipt. The promotion server 302 may thus generate the promotions 304 with customer-specific redemption periods, and may cause the promotions 304 to be transmitted to respective identified customers. For example, the promotion server 302 may determine, based on a customer transaction history, that a particular customer redeems promotions on average 48 hours after receiving the promotion, if they are going to redeem it. Based on the determination, the promotion server 302 may set an expiration of a future promotion for this particular customer to 48 hours after delivery. In some examples, the promotion server 302 may filter the customer profiles and/or customer transaction histories to determine a time of day in which the customer usually shops, or prefers to shop. In some examples, the promotion server 302 may calculate a redemption probability score for different time periods during the day. In such examples, the promotion server 302 may filter data from previous promotion campaigns to determine times in which one or more customers most frequently redeemed previous promotions (e.g., times associated with a high redemption probability score). In some examples, the promotion server 302 may generate the promotion 304 that is formatted to be delivered at or around a time associated with a high redemption probability score. After generating and formatting the promotion 304, the promotion server 302 may cause the promotion 304 to be transmitted to the respective identified customers at the designated times. For example, the promotion server 302 may determine that a customer typically visits a merchant location on the way home from work at 5:30 pm. Based on this determination, the promotion server 302 may format the promotion 304 to be delivered to the customer, such as via an SMS message or email, at around 5:30 pm, to increase a likelihood that the promotion 304 will be redeemed.

Because a promotion with a customer-specific expiration date based on a customer history typically involves a shorter life-span, the user of customer-specific expiration dates can improve memory allocation in the promotion server 302. Also, the customer-specific delivery time increases the likelihood that the promotion will be redeemed, and thus removed from memory quicker. Accordingly, the customer-specific delivery time also improves memory allocation in the promotion server 302. The improvement to memory allocation can improve the functioning of the one or more computing devices of the promotion server 302, by providing more memory space for other data. Additionally, the improvement to memory allocation can further improve the functioning of the one or more computing devices of the promotion server by increasing a speed by which the one or more computing devices of the promotion server 302 can process data.

In various examples, the promotion server 302 may link respective promotions to respective customers identified to receive the promotion 304. As discussed above, the one or more customers may be identified based on merchant input 306 (e.g., criteria, merchant preferences, etc.), and/or transaction data 310 (e.g., transaction history). In various examples, the promotion server 302 may access customer profiles and/or merchant profiles to determine an identifier 312 for each of the identified customer. The promotion server may then link the respective promotions to the respective customers using the identifier 312, such as by embedding a particular identifier 312 into a particular promotion. For example, the identifier 312 for a customer may include an email address. The promotion server 302 may embed the email address or other unique identifier into the promotion for the customer.

In various examples, after generating the promotions 304, and linking the promotions 304 to respective customers, the promotion server may deliver the promotion via one or more promotion delivery channels 314. The promotion delivery channels 314 may include email, SMS messaging, and/or other means of electronic communication. In various examples, the promotion server 302 may send the promotion 304 at a particular time based on the customer preferences and/or customer transaction history. For example, the promotion server 302 may identify that a customer typically shops in the afternoon, after work, and determine this time period to have a high redemption probability score. The promotion server 302 may thus adjust the timing of when to send the promotion 304 to the customer such that it arrives just prior to when the customer typically shops, so the customer is immediately aware of the promotion during a time for which the redemption probability score is sufficiently high.

Additionally or alternatively, the promotion server 302 may generate an offer for the promotion 316. The offer may include promotion and/or promotion campaign information, such as a merchant, a discount, an expiration, or the like. In various examples, the promotion server 302 may cause a publication via one or more offer delivery channels 318. The offer delivery channels 318 may include a web site 320, an application 322, a receipt 324 for a transaction, and/or other methods of delivering an offer.

In various examples, the customer may select the offer 316 for the promotion via the offer delivery channel(s) 318. In some examples, the promotion server 302 may receive, from a computing device associated with the website, an indication that the customer has selected the offer 316. Based on a customer selection of the offer, the promotion server 302 may cause a user interface to surface, requesting the customer to input an identifier for receiving the promotion. The promotion server may receive the identifier and verify that the identifier is not associated with a previously sent promotion 304 via the promotion delivery channel(s) 314 and/or a customer associated therewith. Based on the verification, the promotion server 302 may send the promotion 304 to the identifier input via the offer delivery channel 318.

In various examples, the promotion server 302 may receive the identifier via the offer delivery channel(s) 318, and may determine that the identifier matches an identifier of a previously sent promotion 304 and/or is associated with a recipient of a previously sent promotion 304. Based on the match and/or association, the promotion server 302 may send a notification to a customer device associated with the offer delivery channel 318. The notification may include a message informing the customer that the promotion 304 was previously sent to an identifier associated with the customer. In some examples, the particular identifier may be indicated in the notification. In some examples, the notification may provide the customer an option to have the promotion 304 resent using the original identifier (e.g., resend to the same SMS number, email, etc.) or to an alternate identifier 312 associated with the customer. In some examples, the notification may provide a means by which the customer may input a new identifier 312 to which the promotion server 302 should resend the promotion. In such examples, the promotion server 302 may save the new identifier 312 to the customer profile.

FIGS. 4-7 illustrate flow diagrams of processes for a multi-channel promotion system. Processes 400, 500, 600, and 700 are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 4:
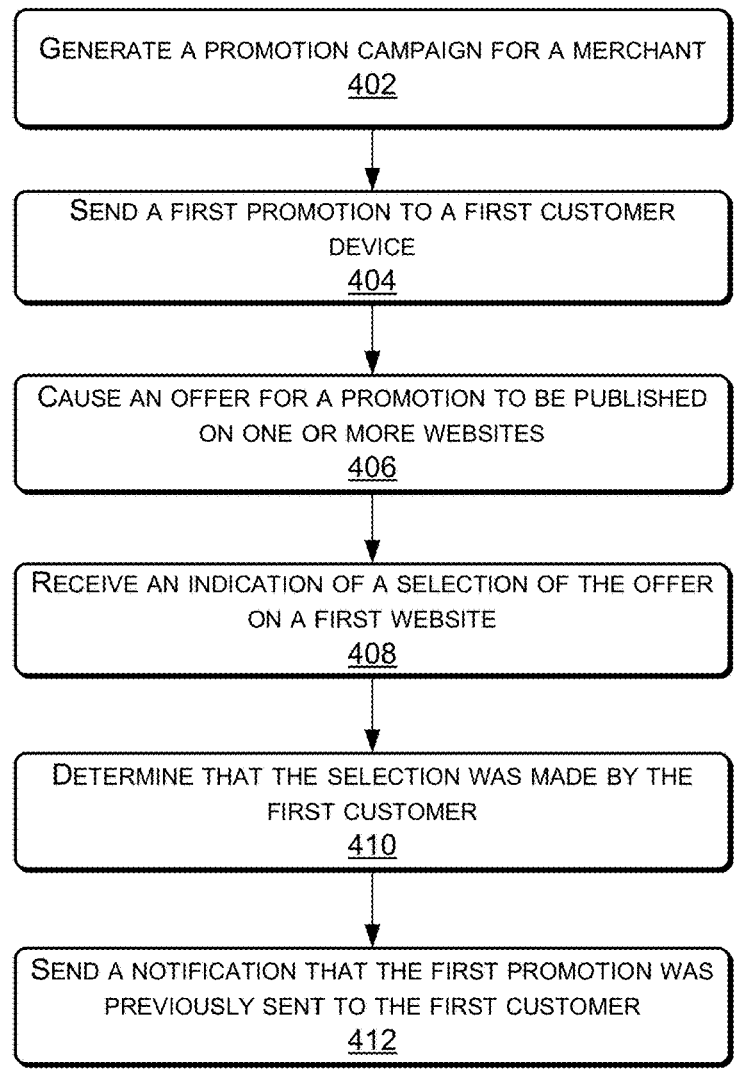
FIG. 4 illustrates a flow diagram of an example process for managing a multi-channel promotion campaign.

FIG. 4 illustrates a flow diagram of an example process 400 for process for managing a multi-channel promotion campaign. In various examples, the process 400 may be performed by a service computing device, such as service computing device 102.

At 402, the service computing device may generate a promotion campaign for a merchant. The promotion campaign may include a promotion and/or an offer for a promotion. In some examples, the promotion campaign may be generated based on one or more merchant-specified criteria. In some examples, the promotion campaign may be generated based on one or more customer preferences. In some examples, the promotion campaign may be generated based on transaction data and/or a transaction history between the merchant and one or more customers.

At 404, the service computing device may send a first promotion to a first customer device. In various examples, a first customer associated with the first customer device may be identified based on the merchant specified criteria and/or the transaction history. The first promotion may be sent via one or more promotion delivery channels, such as email, SMS message, or the like. In some examples, the promotion delivery channel may be determined based on the merchant specified criteria, and/or the customer preference(s).

At 406, the service computing device may cause an offer for a promotion to be published on one or more web sites. The web site(s) may include a social media web site, a web site of the merchant, a news source, and/or another website. In some examples, the offer may include merchant information and/or promotion information.

At 408, the service computing device may receive an indication of a selection of the offer on a first website. In various examples, the indication of the selection may include an identifier provided by customer, such as via a user interface with the website.

At 410, the service computing device may determine that the selection was made by the first customer. In some examples, the determination may be based on the identifier in the selection matching an identifier embedded in the first promotion. In some examples, the determination may be based on the identifier in the selection being associated with the first customer, such as being a second identifier on a customer profile of the first customer. For example, the identifier embedded in the first promotion may be an email address associated with the first customer, and the identifier in the selection may include an SMS messaging number associated with the first customer.

At 412, the service computing device may send a notification to the first customer device indicating that the first promotion was previously sent to the first customer. The notification may include a message informing the first customer that the first promotion was previously sent to an identifier associated with the first customer. In some examples, the identifier to which the first promotion was sent may be indicated in the notification. In some examples, the notification may provide the first customer an option to have the promotion resent using the original identifier (e.g., resend to the same SMS number, email, etc.) or to an alternate identifier associated with the first customer. In some examples, the notification may provide a means by which the customer may input a new identifier to which the first promotion would be resent. In such examples, the service computing device may save the new identifier to a customer profile.

Figure 5:
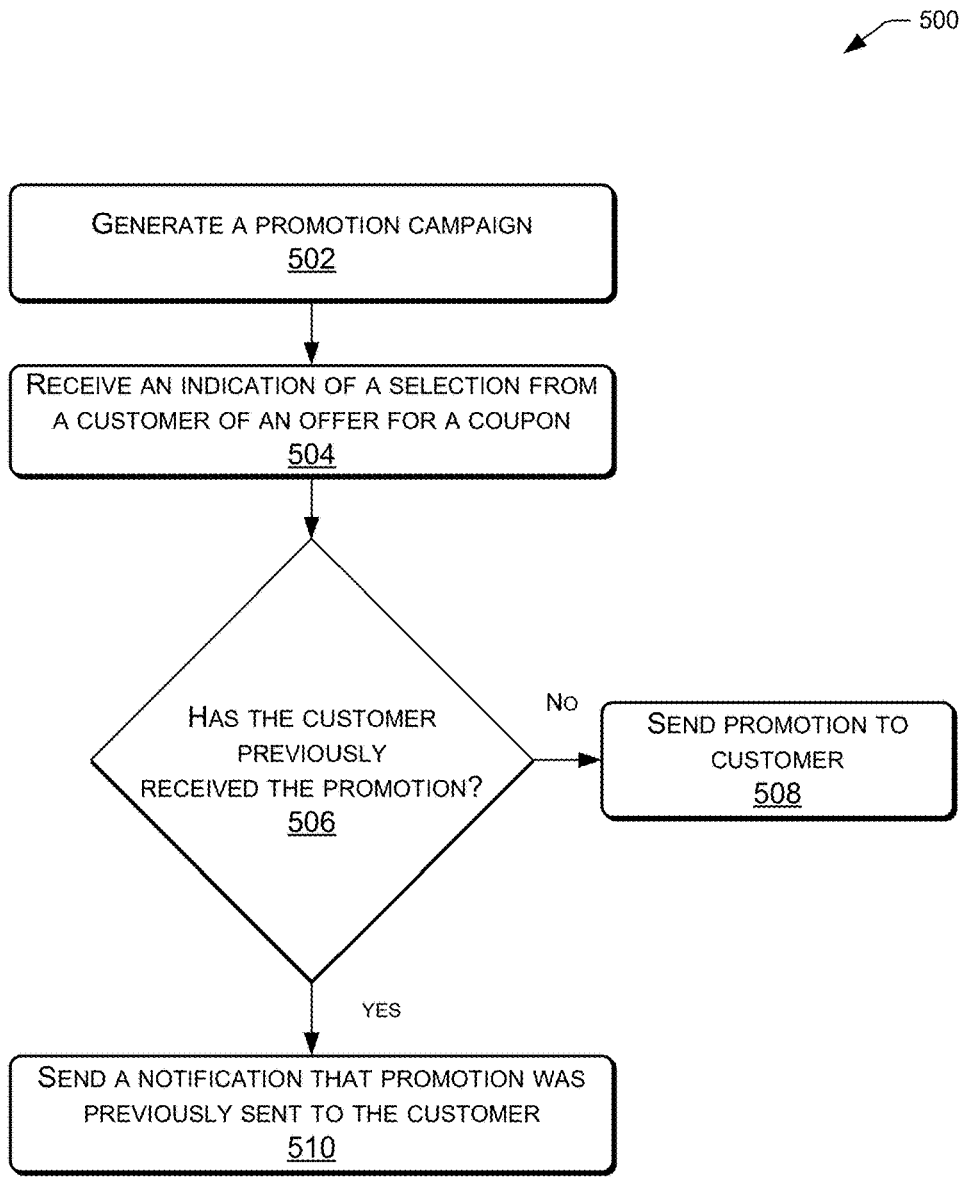
FIG. 5 illustrates a flow diagram of another example process for managing a multi-channel promotion campaign.

FIG. 5 illustrates a flow diagram of an example process 500 for managing a multi-channel promotion campaign. In various examples, the process 500 may be performed by a service computing device, such as service computing device 102.

At 502, the service computing device may generate a promotion campaign for a merchant. The promotion campaign may include a promotion and/or an offer for a promotion. In some examples, the promotion campaign may be generated based on one or more merchant-specified criteria. In some examples, the promotion campaign may be generated based on one or more customer preferences. In some examples, the promotion campaign may be generated based on transaction data and/or a transaction history between the merchant and one or more customers.

At 504, the service computing device may receive an indication of a selection by a customer of an offer for a promotion. In various examples, the offer for the promotion may be published via a website, a receipt for a transaction, an application, or the like. The offer may include merchant and/or promotion information. In some examples, the indication may include an identifier input by the customer with the selection of the offer.

At 506, the service computing device may determine whether the customer has previously received the promotion. In various examples, the service computing device may compare the identifier in the indication to the identifiers embedded in one or more promotions sent to a first group of customers and/or identifiers associated with customer profiles associated with the first group of customers. In some examples, the service computing device may determine that the customer has previously received the promotion based on matching identifiers and/or the identifier in the indication being associated with a customer of the first group of customers, such as in a customer profile.

At 508, based on a determination that the customer had not previously received the promotion, the service computing device may send the promotion to the customer.

At 510, based on a determination that the customer has previously received the promotion, the service computing device may send a notification that the promotion was previously sent to the customer. The notification may include a selectable option to cause the promotion to be resent via the identifier and/or another identifier associated with the customer.

Figure 6:
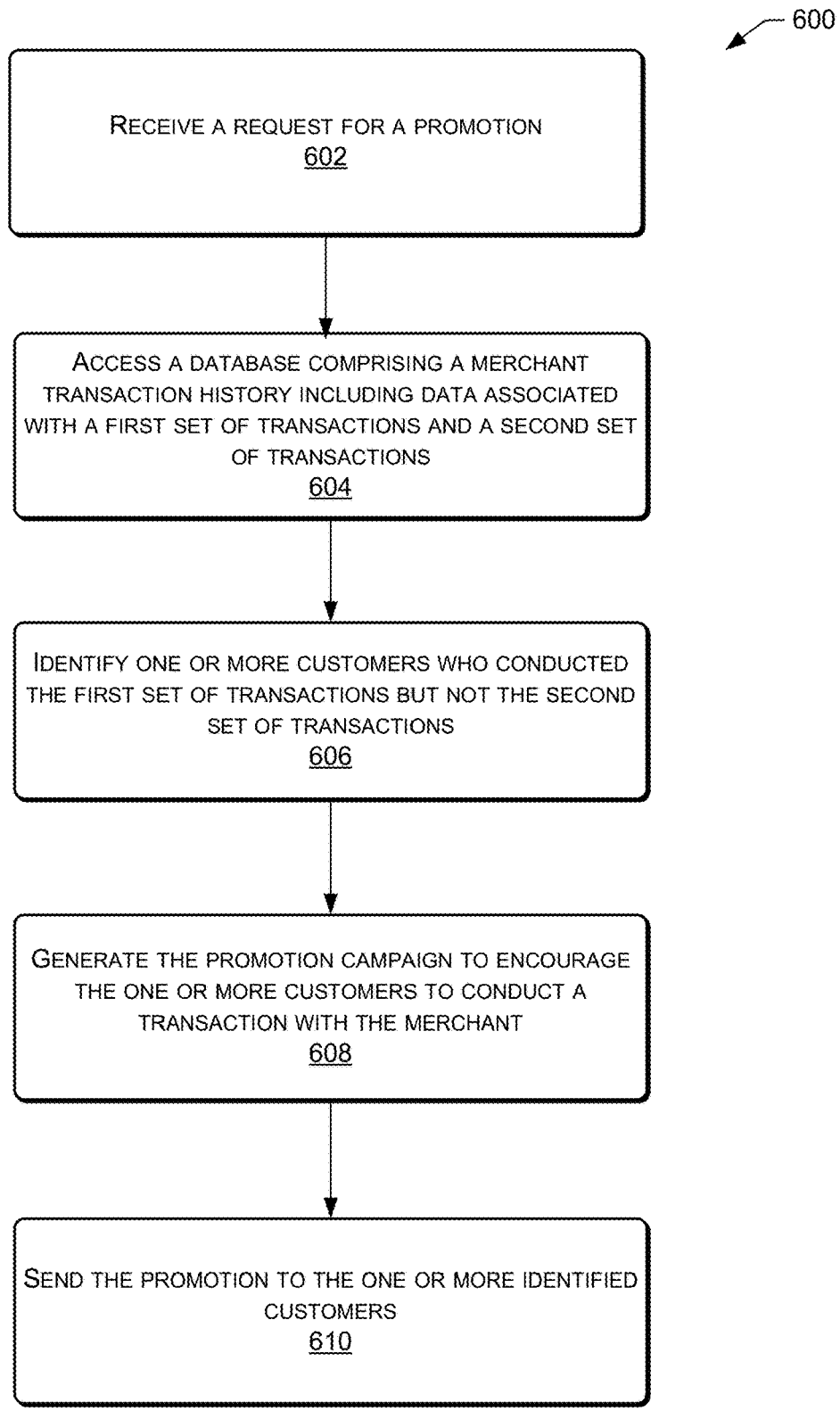
FIG. 6 illustrates a flow diagram of an example process for generating a promotion based on a request from a merchant.

FIG. 6 illustrates a flow diagram of an example process 600 for generating a promotion based on a request from a merchant. In various examples, the process 600 may be performed by a service computing device, such as service computing device 102.

At 602, the service computing device may receive a request for a promotion campaign. In some examples, the request to generate the promotion campaign may include criteria for the promotion campaign. In such examples, the criteria may include a time period and/or range of dates in which to run the promotion campaign (e.g., start data, expiration date, a specified day of validity, etc.), a group of customers to whom the promotion campaign may be initially delivered (e.g., loyalty program members, frequent customers, new customers, etc.), an item to be discounted, an amount of a discount, or the like. In some examples, the criteria may include one or more channels through which the service provider may deliver a promotion (e.g., coupon, discount, reward, etc.) and/or an offer for the promotion to encourage a customer to conduct a transaction with a merchant. The channels may include electronic mail, SMS messages, website(s) (e.g., social media websites, a merchant website, etc.), a receipt for a transaction, or the like.

At 604, the service computing device may access a database comprising merchant transaction history including transaction data associated with a first set of transactions and a second set of transactions. The transaction data may include customers associated with the transactions, a time associated with the transactions, an amount of the transactions, items purchased in the transactions, promotion redemption information, etc. In various examples, the first set of transactions and the second set of transactions may include transactions with the merchant that occurred during a first time period and the second time period, respectively.

At 606, the service computing device may identify one or more customers who conducted the first set of transactions but not the second set of transactions. In some examples, the service computing device may identify one or more customers who conducted the second set of transactions but not the first set of transactions. In various examples, the service computing device may compare a first group of customers associated with the first set of transactions to a second group of customers associated with the second set of transactions to identify the one or more customers. In various examples, the service computing device may also identify customers who conducted a transaction during the first period and a transaction during the second period.

At 608, the service computing device may generate the promotion campaign to encourage the one or more customers to conduct a transaction with the merchant. The service computing device may generate a promotion and/or an offer for the promotion for the promotion campaign. In some examples, the promotion may be generated based on criteria provided by the merchant, one or more customer preferences associated with the one or more identified customers, and/or the transaction history (e.g., customer transaction history, customer promotional redemption history, etc.). Individual promotions of the promotion campaign may be linked to respective customers of the one or more identified customers, such as by identifiers associated with respective customers of the one or more identified customers.

In various examples, the service computing device may generate a modified promotion based on a customer and/or group of customers to whom the promotion campaign is at least partially directed. In such examples, the service computing device may modify a time of expiration of the promotion, a redemption amount, an item to be discounted, and/or other factors associated with the promotion based on transaction history (e.g., customer transaction history) and/or customer preferences of the customer and/or group of customers. For example, the service computing device may determine that a particular customer takes an average of five days to redeem a promotion. The service computing device may generate an unmodified promotion for one or more other customers to whom a promotion campaign is directed, with an expiration of three days, and a modified promotion for the particular customer with an expiration of five days. For another example, the service computing device may identify a group of customers who have not participated in one or more previous promotion campaigns. The service computing device may generate a modified promotion for the group of customers, in order to encourage them into participating in the current promotion campaign. The modified promotion may include a modified redemption time period and/or redemption amount.

At 610, the service computing device may send the promotion to the one or more identified customers. In various examples, the service computing device may send the promotion via the identifier embedded in respective promotions. In other examples, the service computing device may send the promotion via another identifier associated with the customer.

Figure 7:
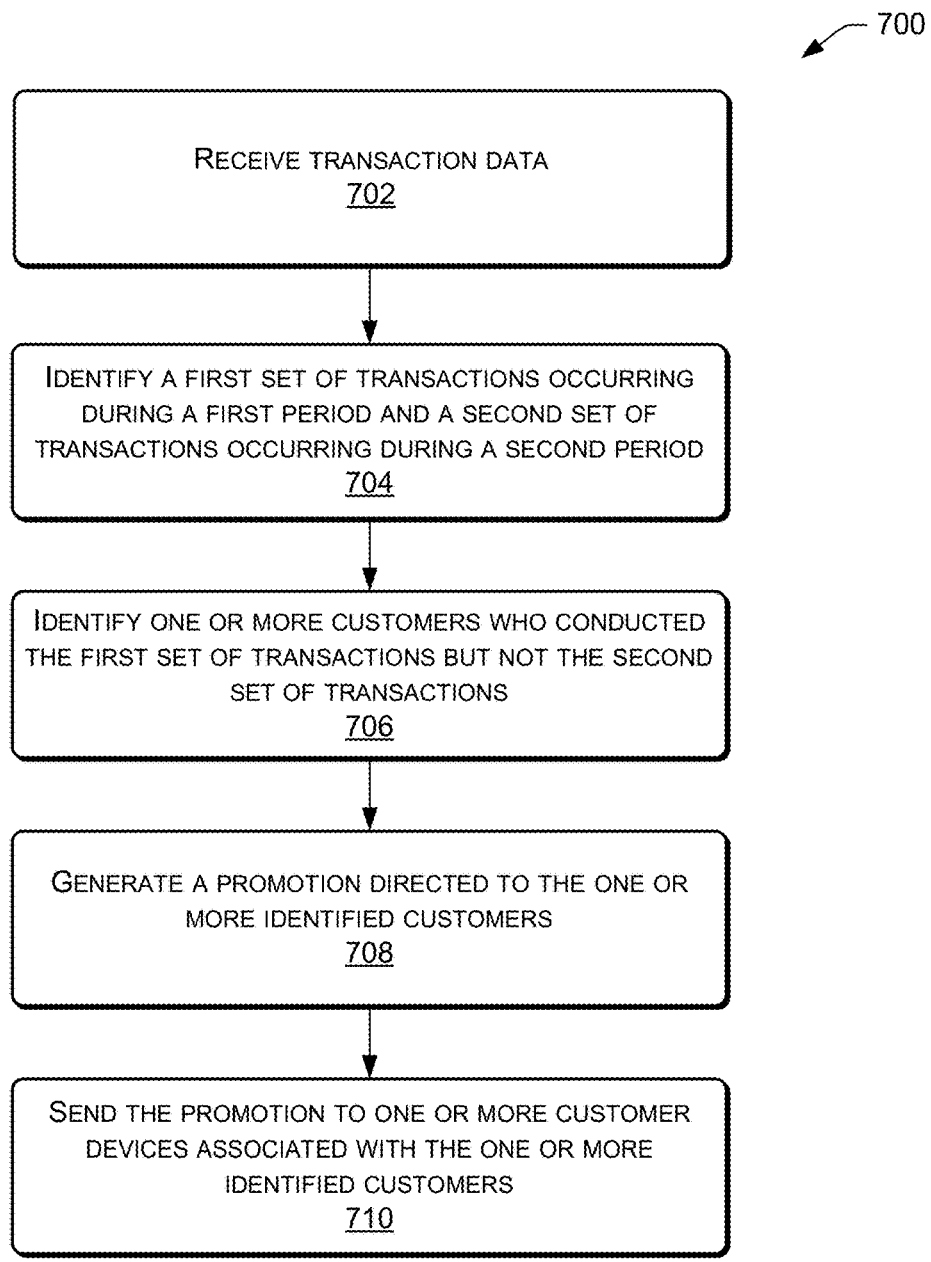
FIG. 7 illustrates a flow diagram of another example process for generating a promotion based on a transaction history of a merchant.

FIG. 7 illustrates a flow diagram of an example process 700 for generating a promotion campaign based on transaction data. In various examples, the process 700 may be performed by a service computing device, such as service computing device 102.

At 702, the service computing device may receive transaction data. The transaction data may include times associated with each transaction, amounts associated with each transaction, items purchased, promotion redemption information (e.g., a number of promotions redeemed versus a number issued or claimed), a success rate of transactions with customer(s) (e.g., percentage of transactions approved), and/or other information relevant to the transactions. In various examples, the service computing device may store the transaction history in a data store. The data store may include a local data store and/or a remote data store.

At 704, the service computing device may identify a first set of transactions occurring during a first period and a second set of transactions occurring during a second period. In various examples, the first set of transactions and the second set of transactions may include transactions with the merchant that occurred during a first time period and the second time period, respectively. The first time periods may be equivalent time periods (i.e., both one week time periods) or they may be different time periods (i.e., the first time period is a week and the second time period is a month). In various examples, the time periods may be determined based on merchant specified criteria, such as that provided in a merchant preference. In some examples, the time periods may be determined by the service computing device, such as based on pre-determined accounting metrics.

At 706, the service computing device may identify one or more customers who conducted the first set of transactions but not the second set of transactions. In some examples, the service computing device may identify one or more customers who conducted the second set of transactions but not the first set of transactions. In various examples, the service computing device may compare a first group of customers associated with the first set of transactions to a second group of customers associated with the second set of transactions to identify the one or more customers. In various examples, the service computing device may also identify customers who conducted a transaction during the first period and a transaction during the second period.

At 708, the service computing device may generate the promotion campaign to encourage the one or more identified customers to conduct a transaction with the merchant. The service computing device may generate one or more promotions and/or offers for the promotion for the promotion campaign. In some examples, the promotions may be generated based on criteria provided by the merchant, one or more customer preferences associated with the one or more identified customers, and/or the transaction history (e.g., customer transaction history, customer promotion redemption history, etc.). Individual promotions of the promotion campaign may be linked to respective customers of the one or more identified customers, such as by identifiers associated with respective customers of the one or more identified customers. In some examples, the promotions of the promotion campaign may be uniform (e.g., each promotion has a same redemption time, redemption amount, redemption item, etc.). In such examples, each of the one or more identified customers may receive the same, unmodified, promotion. In various examples, one or more promotions of the promotion campaign may be tailored to individual customers of the identified customers. In such examples, the service computing device may generate modified promotions, which include modifications tailored individual customers, such as individualized redemption items, redemption amounts, redemption times, etc.

In various examples, the one or more promotions may be tailored to individual customers of the identified customers based at least in part on a customer transaction history. For example, a customer who conducted a transaction with a merchant last month but has not yet conducted a transaction with the merchant this month may receive a promotion with a higher discount, to provide a greater incentive for the customer to patronize the merchant this month. For another example, the service computing device may determine that a customer has conducted a transaction with a merchant during a non-promotional time period, but not during a promotional time period. Based on the determination, the service computing device may tailor a promotion for the customer to encourage the customer to conduct a transaction during a promotional time period, such as by modifying a redemption time period or a redemption amount.

At 710, the service computing device may send the promotion to the one or more identified customers. In various examples, the service computing device may send the promotion via the identifier embedded in respective promotions. In other examples, the service computing device may send the promotion via another identifier associated with the customer.

Figure 8:
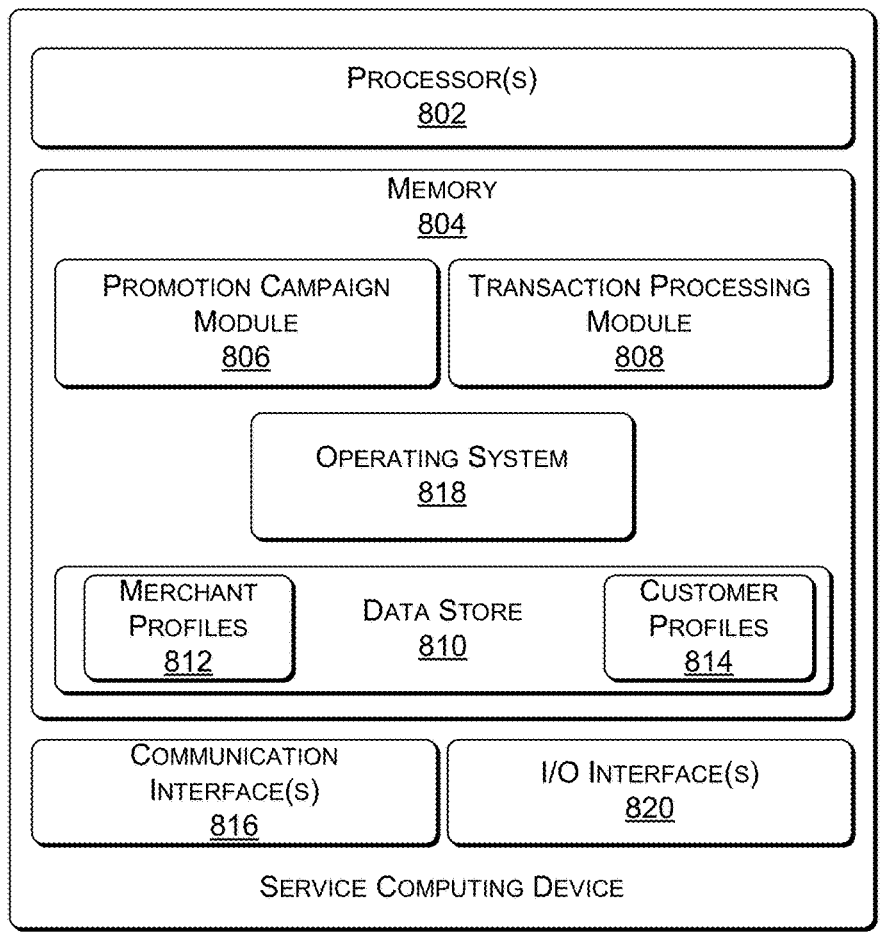
FIG. 8 illustrates select components of an example promotion service computing device configured with a payment instrument verification system.

FIG. 8 illustrates select components of an example service computing device 800, such as service computing device 102, configured with a multi-channel promotion system. The service computing device 800 may be any suitable type of computing device, e.g., mobile, semi-mobile, semi-stationary, or stationary.

Some examples of the service computing device 800 may include tablet computing devices; smart phones and mobile communication devices; laptops, netbooks and other portable computers or semi-portable computers; desktop computing devices, server computing devices, terminal computing devices and other semi-stationary or stationary computing devices; dedicated register devices; or other computing devices capable of sending communications and performing the functions according to the techniques described herein. In at least one example, the service computing device 800 may be one of a plurality of computing devices in a distributed computing platform.

In the illustrated example, the service computing device 800 includes at least one processor 802 and at least one memory 804. Each processor 802 may itself comprise one or more processors or processing cores. For example, the processor 802 may be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 may be configured to fetch and execute computer-readable processor-executable instructions stored in the memory 804.

Depending on the configuration of the transaction service device 800, the memory 804 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 804 may include, but is not limited to, RAM, ROM, EEPROM, flash memory, solid-state storage, magnetic disk storage, optical storage, and/or other computer-readable media technology. Further, in some cases, the service computing device 800 may access external storage, such as RAID storage systems, storage arrays, network attached storage, storage area networks, cloud storage, or any other medium that can be used to store information and that can be accessed by the processor 802 directly or through another computing device or network. Accordingly, the memory 804 may be computer storage media able to store instructions, modules or components that may be executed by the processor 802. Further, when mentioned, non-transitory computer-readable media excludes media such as energy, carrier signals, electromagnetic waves, and signals per se.

The memory 804 may be used to store and maintain any number of functional components that are executable by the processor 802. In some implementations, these functional components comprise instructions or programs that are executable by the processor 802 and that, when executed, implement operational logic for performing the actions and services attributed above to the service computing device 800. Functional components of the service computing device 800 stored in the memory 804 may include a promotion campaign module 806, such as promotion campaign module 112 and a transaction processing module 808, such as transaction processing module 126. The promotion campaign module 806 may be configured to generate, distribute, and manage promotion campaigns, as discussed above with regard to FIGS. 1-7. The transaction processing module 808 may be configured to process transaction data and store a transaction history in a data store 810, such as in a merchant profile 812 and/or a customer profile 814, as discussed above with regard to at least FIG. 1.

In various examples, the promotion campaign module 806 and the transaction processing module 808, may be configured to communicate with a merchant device, a customer device, an social media web server, and/or other computing devices via one or more communication interface(s) 816. The one or more communication interface(s) 816 may include one or more interfaces and hardware components for facilitating communication with various other devices over a network or directly. For example, communication interface(s) 816 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Additional functional components may include an operating system 818 for controlling and managing various functions of the service computing device 800 and for enabling basic user interactions with the service computing device 800, a merchant device, and/or a customer device.

In addition, the memory 804 may also store data, data structures and the like, that are used by the functional components. Depending on the type of the service computing device 800, the memory 804 may also optionally include other functional components and data, which may include programs, drivers, etc., and the data used or generated by the functional components. Further, the service computing device 800 may include many other logical, programmatic and physical components, of which those described are merely examples that are related to the discussion herein.

FIG. 8 further illustrates that the service computing device 800 may include one or more I/O interfaces 820. The I/O interfaces 820 may include speakers, a microphone, a camera, and various user controls (e.g., buttons, a keyboard, a keypad, etc.), a haptic output device, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more non-transitory computer-readable media storing instructions executable by the one or more processors, wherein the instructions program the one or more processors to perform acts comprising:
receiving, by one or more service computing devices associated with a service provider and from instances of a merchant application installed on a plurality of merchant devices operable by a plurality of merchants, transaction data of a plurality of transactions performed between individual merchants of the plurality of merchants and a plurality of customers;
receiving, by the one or more service computing devices and from the instance of the merchant application installed on the merchant device of the merchant, a request for a new promotion, the request comprising criteria that indicates a redemption time period and a redemption amount for the new promotion;
identifying, by the one or more service computing devices and based at least in part on a merchant transaction history associated with the merchant, (a) a first set of transactions associated with a first time period during which a previous promotion offered by the merchant was valid and (b) a second set of transactions associated with a second time period during which at least the previous promotion was not valid;
determining, by the one or more service computing devices, a first set of customers of the plurality of customers based on the first set of transactions, and a second set of customers of the plurality of customers based on the second set of transactions;
identifying, by the one or more service computing devices and based at least in part on comparing the first set of customers to the second set of customers, one or more target customers, wherein the one or more target customers comprise customers included in the second set of customers that are not included in the first set of customers;
accessing, by the one or more service computing devices, a customer transaction history associated with at least one target customer of the one or more target customers, wherein the customer transaction history comprises customer transaction data between the at least one target customer and one or more other merchants of the plurality of merchants;
determining, by the one or more service computing devices and based at least in part on the customer transaction history, a modification to at least one of the redemption time period or the redemption amount for the one or more target customers;
generating, by the one or more service computing devices and based at least in part on the determined modification, a first promotion to encourage the one or more target customers to conduct a transaction during a third time period during which the first promotion is valid;
generating, by the one or more service computing devices, an electronic offer for the first promotion, the electronic offer for the first promotion comprising a first selectable button that, upon selection by a user, is configured to cause a device upon which the electronic offer is displayed to generate an additional user interface configured to enable entry of an identifier associated with a desired means of communication for delivery of the first promotion;
determining, by the one or more service computing devices and based at least in part on the customer transaction history associated with the one or more target customers, a specific day and a specific time to send the electronic offer for the first promotion prior to a predicted transaction between the one or more target customers and at least one of the plurality of merchants;
sending, by the one or more service computing devices and on the specific day and at the specific time, the electronic offer for the first promotion to at least one customer device associated with the one or more target customers via a first electronic channel;
receiving, by the one or more service computing devices, an identifier associated with a desired means of communication for delivery of the first promotion based on the one or more target customers entering the identifier in the additional user interface in response to selection of the selectable button; and
sending, by the one or more service computing devices and based on the received identifier, the first promotion to the one or more target customers via the desired means of communication for redemption.

2. The system of claim 1, the acts further comprising:
identifying at least one customer of the plurality of customers who conducted at least one transaction of the first set of transactions and at least one transaction of the second set of transactions; and
generating a second promotion for the at least one customer who conducted the at least one transaction of the first set of transactions and the at least one transaction of the second set of transactions.

3. The system of claim 1, wherein the criteria further comprise at least one of:
an item to be offered in the new promotion; or
an amount of a discount to be offered in the new promotion.

4. The system recited in claim 1, wherein the customer transaction history indicates at least one of:
an average time of clay in which the at least one target customer conducted transactions with the merchant;
one or more items commonly purchased by the at least one target customer;
an average amount of money the at least one target customer spends with the merchant per transaction;
an average amount of money the at least one target customer spends with other merchants per transaction; or
an average time for the at least one target customer to use promotions.

5. The system recited in claim 1, further comprising:
determining, based on the customer transaction history associated with the at least one target customer, an average time for the at least one target customer to use promotions; and
determining an expiration time of the promotion based at least in part on the average time for the at least one target customer to use the promotions.

6. The system recited in claim 1, further comprising:
determining, based on the customer other transaction history associated with the at least one target customer, a time of day in which the at least one target customer conducts transactions with the merchant; and
sending an electronic offer for the promotion to the at least one target customer based at least in part on the time of day in which the at least one target customer conducts the transactions.

7. A method comprising:
receiving, by one or more service computing devices associated with a service provider and from instances of a merchant application installed on a plurality of merchant devices operable by a plurality of merchants, transaction data of a plurality of transactions performed between individual merchants of the plurality of merchants and a plurality of customers;
identifying, by the one or more service computing devices and based at least in part on a merchant transaction history associated with a merchant, (a) a first set of transactions associated with a first dine period during which a previous promotion offered by the merchant was valid and (b) a second set of transactions associated with a second time period during which at least the previous promotion was not valid;
determining, by the one or more service computing devices and based at, least in part on comparing the first set of transactions to the second set of transactions, one or more customers who conducted a transaction in the first set of transactions during the first dine period but not a transaction in the second set of transactions during the second time period;
accessing, by the one or more service, computing devices, customer transaction histories associated with the plurality of customers, wherein the customer transaction histories comprise customer transaction data between the plurality of customers and uric or more other merchants of the plurality of merchants;
determining, by the one or more service computing devices and based at least in part on the customer transaction histories, a first promotion for a first set of customers and a second promotion for a second set of customers, the second set of customers including the one or more customers;
generating, by the one or more service computing devices, the first promotion and the second promotion;
generating, by the one or more service computing devices, electronic offers corresponding to the first promotion and the second promotion, the electronic offers comprising a first selectable button that, upon selection by a user, is configured to cause a device upon which the electronic offer is displayed to generate an additional user interface configured to enable entry of an identifier associated with a desired means of communication for delivery of the first promotion and the second promotion;
determining, by the one or more service computing devices and based at least in part on the customer transaction history associated with the first and second set of customers, a specific day and a specific time to send the electronic offers for the first and second promotions prior to a predicted transaction between the first and second customers and at least one of the plurality of merchants;
sending, by the one or more service computing devices and on the specific day and at the specific time, the electronic offers for the first and second promotion to customer devices associated with the first and second set of customers via a first electronic channel;
receiving by the one or more service computing devices, identifiers associated with a desired means of communication for delivery of the first and second promotion based on the first and second set of customers entering the identifiers in the additional user interface in response to selection of the selectable button; and
sending, by the one or more service computing devices and based on the received identifiers, the first and second promotions to the first and second set of customers via the desired means of communication for redemption.

8. The method of claim 7, further comprising:
identifying a second customer who conducted at least one transaction of the first set of transactions and at least one transaction of the second set of transactions; and
generating a third promotion for the second customer.

9. The method of claim 8, wherein the third promotion comprises a discount for a subsequent transaction with the merchant.

10. The method of claim 7, further comprising:
receiving, from the merchant device associated with the merchant via, a request for a new promotion, the request indicating criteria for the new promotion,
wherein the identifying the first set of transactions and the second set of transactions is based at least in part on the request.

11. The method of claim 10, further comprising:
accessing a merchant profile to determine a first duration of the first time period and a second duration of the second time period,
wherein the identifying the first set of transactions and the second set of transactions is based at least in part on the first duration and the second duration.

12. The method of claim 7, wherein the customer transaction histories further comprise at least one of:
an average time of day in which a customer conducts transaction with the merchant;
one or more items purchased by the customer;
an average amount of money the customer spends with the merchant per transaction;
an average amount of money the customer spends with other merchants per transaction; or
an average time for the customer to use promotions.

13. The method of claim 7, further comprising:
determining, based on a customer transaction history associated with a customer, an average time for the customer to use promotions; and
determining an expiration time of the first promotion based at least in part on the average time for the customer to use the promotions.

14. The method of claim 7, further comprising:
determining, based on the customer transaction histories, a time of day in which a customer conducts transactions with the merchant; and
sending an electronic offer for the first promotion to the customer based at least in part on the time of day in which the customer conducts the transactions.

15. A service computing device comprising:
one or more processors; and
one or more non-transitory computer-readable media storing instructions executable by the one or more processors, wherein the instructions cause the one or more processors to perform acts comprising:
- receiving, by the service computing device associated with a service provider and from instances of a merchant application installed on a plurality of merchant devices operable by a plurality of merchants, transaction data of a plurality of transactions performed between individual merchants of the plurality of merchants and a plurality of customers;
- receiving, by the service computing device and from the instance of the merchant application installed on the merchant device of the merchant, a request for a new promotion;
- identifying, by the service computing device and based at east in part on a merchant transaction history associated with the merchant, (a) a first set of transactions associated with a first time period during which a previous promotion offered by the merchant was valid and (b a second set of transactions associated with a second time period during which at least the previous promotion was not valid;
- determining, by the service computing device and based at least in part on comparing the first set of transactions with the second set of transactions, one or more customers associated with at least one transaction in the first set of transactions but not the second set of transactions;
- accessing, by the service computing device, customer transaction histories associated with the plurality of customers, wherein the customer transaction histories comprises customer transaction data between the at least one target customer and one or more other merchants of the plurality of merchants;
- determining, by the service computing device and based at least in part on the customer transaction histories, a first promotion for a first set of customers and a second promotion for a second set of customers, wherein the second set of customers includes the one or more customers;
- generating, by the service computing device, the first promotion and the second promotion to encourage the first set of customers and the second set of customers to conduct a transaction during a third time period during which both the first promotion and second promotion are valid;
- generating, by the service computing device, electronic offers corresponding to the first promotion and the second promotion, the electronic offers comprising a first selectable button that, upon selection by a user, is configured to cause a device upon which the electronic offer is displayed to generate an additional user interface configured to enable entry of an identifier associated with a desired means of communication for delivery of the first promotion and the second promotion;
- determining, by the service computing device and based at least in part on the customer transaction histories associated with the first and second set of customers, a specific day and a specific time to send the electronic offers for the first and second promotion prior to a predicted transaction between the first and second customers and one of the plurality of merchants;
- sending, by the service computing device and on the specific day and at the specific time, the electronic offers for the first and second promotion to customer devices associated with the first and second set of customers via a first electronic channel;
- receiving, by the service computing device, identifiers associated with a desired means of communication for delivery of the first and second promotion based on the first and second set of customers entering the identifiers in the additional user interface in response to selection of the selectable button; and
- sending, by the service computing device and based on the received identifiers, the first and second promotions to the first and second set of customers via the desired means of communication for redemption.

16. The service computing device of claim 15, the acts further comprising:
- identifying at least one customer who conducted at least one transaction in the first set of transactions and at least one transaction in the second set of transactions; and
- generating a third promotion for the at least one customer.

17. The service computing device of claim 16, wherein the third promotion comprises a discount for a subsequent transaction with the merchant.

18. The service computing device of claim 15, wherein the request comprises criteria for the promotion, the criteria including at least one of:
- a time period for the promotion;
- an item to be offered in the promotion; or
- an amount of a discount to be offered in the promotion.

19. The service computing device of claim 15, wherein each customer transaction history of the customer transaction histories indicates at least one of:
- an average time of day in which the one or more customers conducted transactions with the merchant;
- one or more items commonly purchased by the one or more customers;
- an average amount of money the one or more customers spend with the merchant per transaction;
- an average amount of money the one or more customers spend with other merchants per transaction; or
- an average time for the one or more customers to use promotions.

20. The service computing device of claim 15, the acts further comprising:
- determining, based on the customer transaction histories associated with a customer, an average time for the customer to use promotions; and
- determining an expiration time of the first promotion based at least in part on the average time for the customer to use the promotions.

* * * * *

UNITED STATES PATENT AND TRADEMARK OFFICE
CERTIFICATE OF CORRECTION

PATENT NO. : 11,295,337 B1  
APPLICATION NO. : 15/610213  
DATED : April 5, 2022  
INVENTOR(S) : Ramy Bebawy et al.

Page 1 of 1

It is certified that error appears in the above-identified patent and that said Letters Patent is hereby corrected as shown below:

In the Claims

Column 25, Line 29, Claim 7, change "dine" to -- time --.

Column 25, Line 38, Claim 7, change "dine" to -- time --.

Column 25, Line 45, Claim 7, change "uric" to -- one --.

Column 27, Line 19, Claim 15, change "east" to -- least --.

Signed and Sealed this  
Twenty-first Day of June, 2022

Katherine Kelly Vidal  
*Director of the United States Patent and Trademark Office*